US007391326B2

(12) United States Patent
Puzio et al.

(10) Patent No.: US 7,391,326 B2
(45) Date of Patent: Jun. 24, 2008

(54) WIRELESS ASSET MONITORING AND SECURITY SYSTEM

(75) Inventors: Daniel Puzio, Baltimore, MD (US); Lawrence E. Milburn, Bel Air, MD (US); Fred S. Watts, New Freedom, PA (US); Charles P. Mooney, Dallastown, PA (US); Robert Bradus, Bel Air, MD (US); James Watson, Fallston, MD (US); William E. Pugh, II, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/899,567

(22) Filed: Sep. 6, 2007

(65) Prior Publication Data

US 2008/0001755 A1 Jan. 3, 2008

Related U.S. Application Data

(62) Division of application No. 10/997,164, filed on Nov. 24, 2004, now Pat. No. 7,339,477.

(60) Provisional application No. 60/626,758, filed on Nov. 11, 2004, provisional application No. 60/524,829, filed on Nov. 24, 2003, provisional application No. 60/524,811, filed on Nov. 24, 2003, provisional application No. 60/524,822, filed on Nov. 24, 2003.

(51) Int. Cl.
*G08B 13/14* (2006.01)
*G06F 7/04* (2006.01)

(52) U.S. Cl. ................. 340/572.1; 340/568.1; 340/10.1; 340/5.61; 726/2

(58) Field of Classification Search .............. 340/572.1, 340/568.1, 10.1, 5.61, 572.2, 572.8, 5.2, 340/5.21, 5.1, 5.73, 572.4, 539.24, 686.1, 340/686.6, 680; 726/2
See application file for complete search history.

(56) References Cited

U.S. PATENT DOCUMENTS 5,257,007 A 10/1993 Steil et al. ................ 340/539.1
5,587,701 A 12/1996 Hess .......................... 340/541

(Continued)

FOREIGN PATENT DOCUMENTS

GB 2387744 A 10/2003

(Continued)

*Primary Examiner*—Toan N Pham
(74) *Attorney, Agent, or Firm*—Harness, Dickey & Pierce, P.L.C.

(57) ABSTRACT

An asset monitoring and security system includes at least one asset assigned a unique identifier and operable wirelessly transmit an identification signal embodying the identifier. A data store maintains a list of the assets and privileges associated with the assets for authorized users of the assets. A control unit is adapted to receive identification signals from the assets and monitor positions of the assets within a defined area. The control unit communicates with the data store and is further operable to initiate an alarm event when privileges associated with a given asset for authorized users of the asset are exceeded. Each of the assets includes a lock-out mechanism that impedes use of the asset when the lock-out mechanism is activated. The control unit activates the lock-out mechanism of a given asset when the privileges associated with the asset for authorized users of the asset are exceeded.

24 Claims, 16 Drawing Sheets

U.S. PATENT DOCUMENTS

| | | | | |
|---|---|---|---|---|
| 5,612,668 | A | 3/1997 | Scott | 340/426.1 |
| 5,664,113 | A | 9/1997 | Worger et al. | 705/28 |
| 5,777,551 | A | 7/1998 | Hess | 340/541 |
| 5,850,180 | A | 12/1998 | Hess | 340/541 |
| 5,886,634 | A | 3/1999 | Muhme | 340/572.1 |
| 5,939,981 | A | 8/1999 | Renney | 340/539.1 |
| 5,949,335 | A | 9/1999 | Maynard | 340/572.1 |
| 6,005,489 | A * | 12/1999 | Siegle et al. | 340/825.69 |
| 6,049,273 | A | 4/2000 | Hess | 340/539.1 |
| 6,133,832 | A | 10/2000 | Winder et al. | 340/572.1 |
| 6,181,244 | B1 | 1/2001 | Hall et al. | 340/541 |
| 6,232,877 | B1 | 5/2001 | Ashwin | 340/572.1 |
| 6,297,737 | B1 | 10/2001 | Irvin | 340/571 |
| 6,300,872 | B1 | 10/2001 | Mathias et al. | 340/540 |
| 6,331,817 | B1 | 12/2001 | Goldberg | 340/573.1 |
| 6,429,769 | B1 | 8/2002 | Fulgueira | 340/5.33 |
| 6,433,689 | B1 | 8/2002 | Hovind et al. | 340/573.1 |
| 6,441,731 | B1 | 8/2002 | Hess | 340/539.1 |
| 6,501,378 | B1 | 12/2002 | Knaven | 340/539.1 |
| 6,577,238 | B1 | 6/2003 | Whitesmith et al. | 340/572.1 |
| 6,624,752 | B2 | 9/2003 | Klitsgaard et al. | 340/572.1 |
| 6,628,323 | B1 | 9/2003 | Wegmann | 348/143 |
| 6,674,364 | B1 | 1/2004 | Holbrook et al. | 340/568.1 |
| 6,674,368 | B2 | 1/2004 | Hawkins et al. | 340/573.4 |
| 6,788,299 | B2 | 9/2004 | Moriwaki et al. | 345/419 |
| 6,850,151 | B1 | 2/2005 | Calhoun et al. | 340/309.16 |
| 6,853,303 | B2 | 2/2005 | Chen et al. | 340/573.1 |
| 7,042,360 | B2 | 5/2006 | Light et al. | 340/572.1 |
| 7,123,149 | B2 | 10/2006 | Nowak et al. | 340/572.1 |
| 7,231,657 | B2 * | 6/2007 | Honarver et al. | 726/2 |
| 7,298,240 | B2 * | 11/2007 | Lamar | 340/5.6 |
| 7,336,181 | B2 * | 2/2008 | Nowak et al. | 340/572.1 |
| 2002/0089434 | A1 | 7/2002 | Ohanes | 340/988 |
| 2002/0153418 | A1 | 10/2002 | Maloney | 235/384 |
| 2002/0174025 | A1 | 11/2002 | Hind et al. | 705/26 |
| 2003/0120745 | A1 | 6/2003 | Katagishi et al. | 709/217 |
| 2006/0179473 | A1 * | 8/2006 | Innami et al. | 726/2 |

FOREIGN PATENT DOCUMENTS

| | | |
|---|---|---|
| WO | WO 02/045029 A2 | 6/2002 |

* cited by examiner

19

| User ID | Password | User's Name | Authorized Assets/Privileges | Distance |
|---|---|---|---|---|
| ID#1 | Password #1 | Employee A | 1-A, 3-B, 5-B, 6-A | 2.0 m |
| ID#2 | Password #2 | Employee B | 1-C, 7-A | 3.5 m |
| ID#3 | Password #3 | Employee C | 2-A, 3-B, 7-C, 8-A | 6.0 m |
| ID#4 | Password #4 | Employee D | 1-B, 2-B, 3-B, 7-B | Unknown |
| ID#5 | Password #5 | Employee E | 1-C, 2-C, 3-A, 4-B, 5-B, 6-A | 9.5 m |

FIG. 2

| Asset | Assigned User | Activation | Availability | Distance | Status | Last Checkin | Operating Time |
|---|---|---|---|---|---|---|---|
| 1 | D | Unlocked | Out | 3.5 m | OK | 11/02/2003 4:18PM | 2 hrs. 10 mins. |
| 2 | NONE | Locked | In | 0.5 m | OK | 11/10/2003 2:45PM | NA |
| 3 | A | Locked | Out | Unknown | Alarm | 11/10/2003 1:09PM | NA |
| 4 | NONE | Locked | In | 0.5 m | OK | 11/10/2003 4:16PM | NA |
| 5 | B | Unlocked | Out | 4.0 m | OK | 11/10/2003 5:14PM | 0 hrs. 45 mins. |

144

FIG. 9A

| Asset | Last Checkout | Due Date |
|---|---|---|
| 1 | 11/11/2003 9:18AM | 11/11/2003 5:00PM |
| 2 | 11/10/2003 3:11AM | NA |
| 3 | 11/11/2003 7:45AM | Alarm |
| 4 | 11/11/2003 8:34AM | NA |
| 5 | 11/11/2003 6:55AM | 11/12/2003 6:00AM |

144

FIG. 9B

WIRELESS ASSET MONITORING AND SECURITY SYSTEM

CROSS-REFERENCE TO RELATED APPLICATIONS

This application is a divisional of U.S. patent application Ser. No. 10/997,164 filed on Nov. 24, 2004 and claims the benefit of U.S. Provisional Application Nos. 60/524,811, 60/524,822, and 60/524,829, all filed on Nov. 24, 2003, and U.S. Provisional Application No. 60/626,758 "WIRELESS ASSET MONITORING AND SECURITY SYSTEM", filed on Nov. 11, 2004. The disclosures of the above references are all hereby incorporated by reference in their entireties.

FIELD OF THE INVENTION

The present invention relates to security management systems, and more particularly to security management systems for wireless asset monitoring.

BACKGROUND OF THE INVENTION

Construction sites and other industrial job site locations are typically unsecured areas. Loss and theft of tools and other construction equipment is a common occurrence at such sites. For example, a job site may remain exposed to the threat of theft and/or vandalism at night. The tools and/or equipment at an industrial job site typically include very expensive power tools and construction materials. Theft of such items amounts to considerable losses and expenses. While contractors may utilize security guards or guard dogs to ensure the security of tools and other equipment at night, this is very expensive. Additionally, theft and/or vandalism may still occur during the day.

Contractors commonly utilize portable containers to house large numbers of tools and other construction equipment. For example, a contractor may utilize one or more metallic gang boxes. While the tools and/or equipment are not being used, a contractor may attempt to prevent unauthorized access to the insides of the containers. For example, the contractor may utilize devices such as locks, chains, and/or straps to secure the containers. However, such containers may remain open for a long time while the tools and equipment are being used. Therefore, such devices do not guarantee the security of the tools and equipment at all times of the day. Additionally, it is difficult to keep track of and maintain an inventory of tools and equipment on a job site.

In one approach, a contractor employs a rigorous check-in/check-out process with all of the tools and equipment on a job site. However, this requires additional time, personnel, and expenses. Alternatively, a contractor may take an inventory of tools and equipment at the end of a day. Depending on the number of tools and equipment at the job site, this can be very time consuming and expensive. Additionally, a contractor may not notice that tools or equipment are damaged and/or missing until the end of the day.

SUMMARY OF THE INVENTION

An asset monitoring and security system according to the present invention includes at least one asset assigned a unique identifier and operable to transmit an identification signal embodying the identifier over a wireless communications link. A data store maintains a list of the assets and privileges associated with the assets for authorized users of the assets. A control unit is adapted to receive identification signals from the assets and monitor positions of the assets within a defined area based on the identification signals. The control unit communicates with the data store and is further operable to initiate an alarm event when privileges associated with a given asset for authorized users of the asset are exceeded.

In other features, the data store maintains a list of users authorized to use the assets and privileges associated with the assets for each of the authorized users. The control unit is operable to initiate an alarm event when privileges associated with a given authorized user for a given asset are exceeded. A data input device is adapted to receive a personal identifier input by a user that uniquely identifies the user and a list of desired assets input by the user that the user desires to possess during an asset check-out process. The data input device is operable to transmit the personal identifier and the list of desired assets to the data store. The control unit associates a given asset with the user based on the personal identifier and the list of desired assets. A privilege associated with a given asset for authorized users of the asset limits authorized users to possession of the asset within the defined area. The control unit initiates the alarm event when the asset is located outside of the defined area.

In still other features of the invention, a privilege associated with an asset for a given authorized user limits the authorized user to possession of the asset within the defined area. The control unit initiates the alarm event when the given authorized user possesses the asset outside of the defined area. The control unit generates a departure time for an asset when the asset moves from within the defined area to outside of the defined area. The control unit stores the departure time in the data store. The control unit generates a return time for an asset when the asset moves from outside of the defined area to within the defined area. The control unit stores the return time in the data store. At least one user identification device is assigned a unique identifier and operable to transmit an identification signal embodying the identifier to the control unit over a wireless communications link.

In yet other features, the control unit is adapted to receive identification signals from the user identification devices and monitor positions of the user identification devices within the defined area based on the identification signals from the user identification devices. The control unit associates an asset with a user when the control unit detects a user identification device of the user within a predetermined distance of the asset. The user identification device includes an alarm indicator. The control unit activates the alarm indicator when a distance between the user identification device and the asset associated with the user identification device is greater than a second predetermined distance.

In still other features of the invention, the control unit activates at least one of an audible indicator and/or a visible indicator at least one of during and/or after the alarm event. The control unit includes a wireless transmitter operable to transmit an alarm message to a remote monitoring system at least one of during and/or after the alarm event. A camera communicates with the control unit and captures an image of an asset at an exit point of the defined area when the asset one of moves from within the defined area to outside of the defined area or moves from outside of the defined area to within the defined area. A camera communicates with the control unit and captures an image of a user at least one of during and/or after the asset check-out process.

In yet other features, each of the assets includes a lock-out mechanism that impedes use of the asset when the lock-out mechanism is activated. The control unit activates the lock-out mechanism of a given asset when the privileges associated with the asset for authorized users of the asset are exceeded.

A privilege associated with a given asset for authorized users of the asset limits authorized users to possession of the asset within the defined area. The control unit activates the lock-out mechanism of the asset when the asset is located outside of the defined area.

In still other features of the invention, each of the assets includes a lock-out mechanism that impedes use of the asset when the lock-out mechanism is activated. The control unit deactivates the lock-out mechanism of a given asset when a user identification device of an authorized user of the asset is within a predetermined distance of the asset and activates the lock-out mechanism when a user identification device of an authorized user is not within the predetermined distance of the asset. The lock-out mechanism of a given asset is one activated or deactivated when the asset is associated with an authorized user of the asset and the asset is within a predetermined distance of an asset activation device. The lock-out mechanism of a given asset is one of activated or deactivated when a user identification device of an authorized user of the device is within a first predetermined distance of the asset and the asset is within a second predetermined distance of the asset activation device. The control unit verifies the presence of all of the assets within the defined area and initiates the alarm event when one of the assets is outside of the defined area.

In yet other features, the control unit is enclosed within a housing that is configured to be mounted on a surface of a container that houses the assets. The housing includes primary and backup power supplies that power the control unit. The backup power supply powers the control unit when the primary power supply fails. A tamper prevention mechanism fastens the backup power supply to the housing. The control unit initiates the alarm event when the backup power supply is removed from the housing while the tamper prevention mechanism is enabled. The primary power supply is one of a solar power panel or a fuel cell module and the backup power supply is a rechargeable battery. The primary power supply powers the control unit and maintains a charge voltage of the backup power supply. The primary and backup power supplies are rechargeable batteries. The primary power supply fails when the primary power supply discharges below a predetermined voltage.

In still other features of the invention, the control unit is enclosed within a housing that is configured to be utilized as hand-held device. The housing includes a vibrating indicator. The control unit activates the vibrating indicator at least one of during and/or after the alarm event. The assets are power tools and the defined area is an industrial job site location. A display module displays at least one of an illustration of a given asset and/or a personal identifier that uniquely identifies the asset when privileges associated with the asset for authorized users of the asset are exceeded.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a table illustrating an exemplary user identification database that includes user authorizations and privileges for individual assets;

FIGS. 9A-9B are a table illustrating an exemplary asset status database that provides information about individual assets;

DETAILED DESCRIPTION OF THE PREFERRED EMBODIMENTS

The following description of the preferred embodiment(s) is merely exemplary in nature and is in no way intended to limit the invention, its application, or uses. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality. An exemplary embodiment of the present invention is outlined below with respect to wireless monitoring of tools and construction equipment at an industrial job site. However, analogous operation of the present invention is contemplated with respect to monitoring of other objects and/or devices with appreciable value or importance.

For example, the methods of the present invention may be utilized to monitor valuable items such as jewelry.

Figure 1:
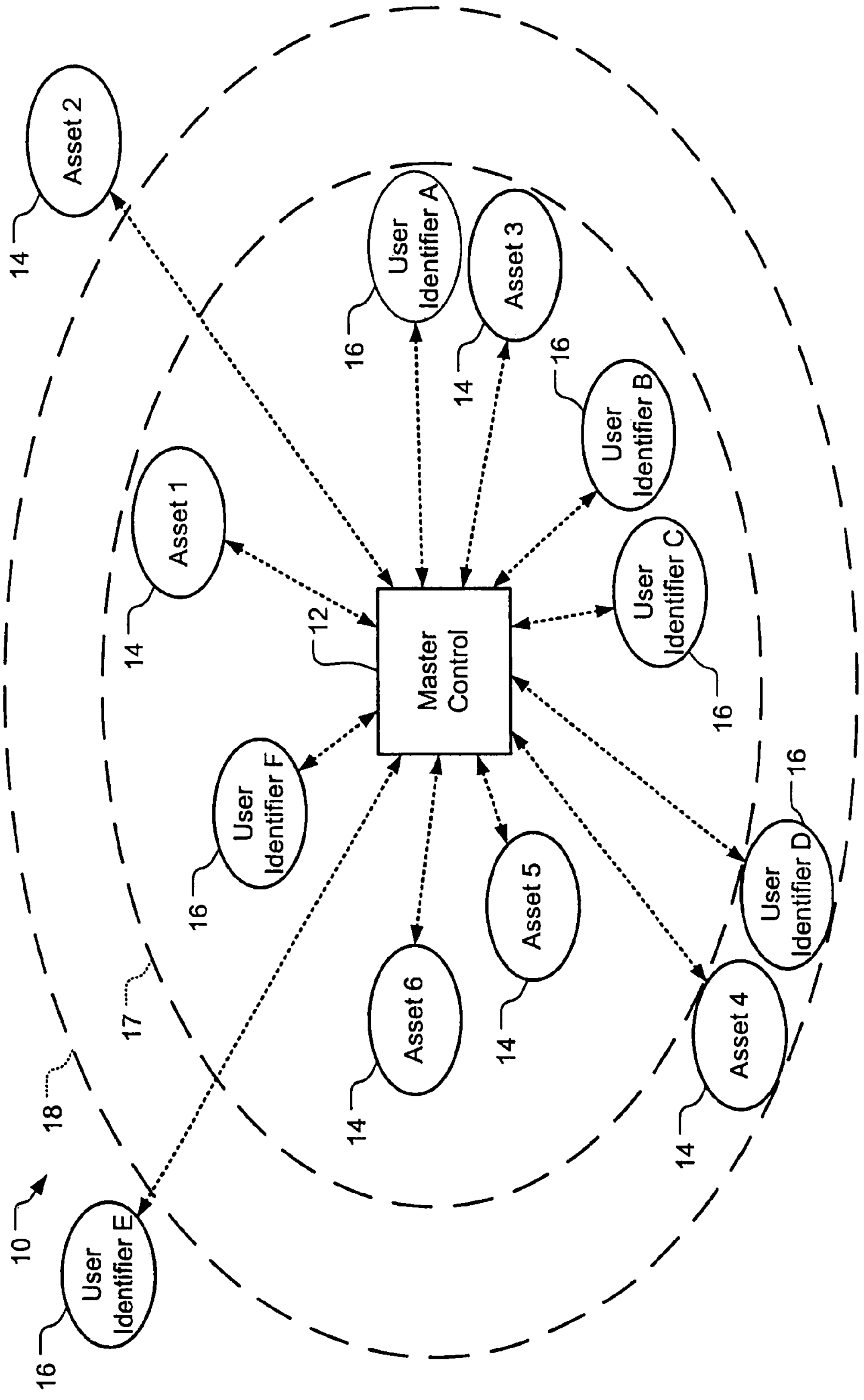
FIG. 1 illustrates an asset monitoring and security system including a control module that communicates with assets and user identification devices according to the present invention.

Referring now to FIG. 1, an asset monitoring and security system 10 includes a master control device 12 that wirelessly communicates with assets 14. In an exemplary embodiment, the assets 14 are power tools and/or other construction equipment at an industrial job site location. Each of the assets 14 is assigned a unique identifier. The assets 14 include means for storing the unique identifiers. For example, the unique identifiers may be embodied in radio frequency identification (RFID) tags that are fastened to or embedded into the assets. The assets 14 wirelessly transmit respective unique identifiers to the master control device 12.

The master control device 12 detects positions of the assets 14 based on the unique identifiers. For example, the master control device 12 may estimate a distance to an asset based on the strength of the identification signal that is transmitted by the asset 14. The master control device 12 is capable of detecting when the assets 14 move outside of a defined area 17. In an exemplary embodiment, the defined area 17 is less than a maximum range of communications, indicated by 18, between the master control device 12 and the assets 14. This ensures that the master control device 12 has a sufficient opportunity to detect an asset 14 outside of the defined area 17 before the asset 14 is out of the range of communications for the master control device 12. For example, in FIG. 1, "Asset 2" 14 is located out of the range of communications for the master control device. While "Asset 4" 14 is located outside of the defined area 17, "Asset 4" 14 is still within the range of communications for the master control device 12.

The master control device 12 includes a data storage device and maintains a database in the data storage device. The database includes listings of users that are authorized to possess and/or use the assets 14. Additionally, the database may include privileges associated with the assets 14 for each of the users. For example, a first user may have permission to use a first asset 14 within the defined area 17. However, the first user may not have permission to remove the asset 14 from the defined area. In the event that a user exceeds assigned privileges, the master control device 12 may initiate an alarm event. The alarm event may include activating an alarm indicator such as a siren or a light. The alarm event may also include transmitting an alarm message to a remote monitoring station. Additionally, in the case where the assets 14 are power tools, the alarm event may include locking the functional circuitry of one or more of the assets 14. Still other actions in response to a security breach are contemplated.

The master control device 12 may associate an asset 14 with a particular user in a number of ways. The master control device 12 may communicate with a control panel that allows users to check-out desired assets by entering a username and password. After the user checks out the asset 14, the master control device 12 monitors use of the asset 14 with respect to applicable predefined privileges granted to the user in relation to the asset 14. For example, two different users may have different privileges with respect to the same asset 14. Alternatively, the master control device 12 may associate an asset 14 with a user by detecting the user within a predetermined distance of the asset 14.

As shown in FIG. 1, the master control device also communicates with a plurality of user identification devices 16. The user identification devices 16 are assigned to users of the assets 14. The user identification devices 16 are also each assigned a unique identifier. The user identification devices 16 include means for storing the unique identifiers. For example, the unique identifiers may be embodied in RFID tags that are incorporated into employee identification badges worn by the users. The user identification devices 16 transmit respective unique identifiers to the master control device 12.

The master control device 12 estimates positions of the user identification devices 16 based on the identification signals transmitted by the user identification devices 16. The master control device 12 may associate a user with an asset 14 by detecting a user identification device 16 of the user within a predetermined distance of the asset 14. For example, the master control device 12 may detect the user identification device 16 of the user within three feet of the asset 14 to associate the user with the asset 14. As shown in FIG. 1, the master control device 12 may not associate "Asset 1" 14 with "User Identifier F" 16. However, at the same time, the master control device 12 associates "Asset 3" 14 with "User Identifier A" 16.

Referring now to FIG. 2, the master control device 12 maintains an exemplary user identification database 19. The user identification database 19 includes usernames and passwords that correspond with names of users. The user identification database 19 includes a listing of assets 14 that each of the users are authorized to operate and/or possess. The user identification database 19 also lists privileges that are granted to users with respect to individual assets 14. For example, a first user may be entitled to privilege "A" with respect to a first asset 14, and a second user may be entitled to privilege "B" with respect to the same asset 14.

While both users may be entitled to possess and use the asset 14 within the defined area 17, privilege "A" may entitle only the first user to remove the asset 14 from the defined area 17. In this case, the master control device 12 may initiate an alarm event if the second user attempts to remove the asset 14 from the defined area 17. The user identification database 19 also includes estimated distances to respective user identification devices 16. As with the assets 14, the master control device 12 may determine distances to user identification devices 16 based on the strength of identification signals received from the user identification devices 16.

Figure 3:
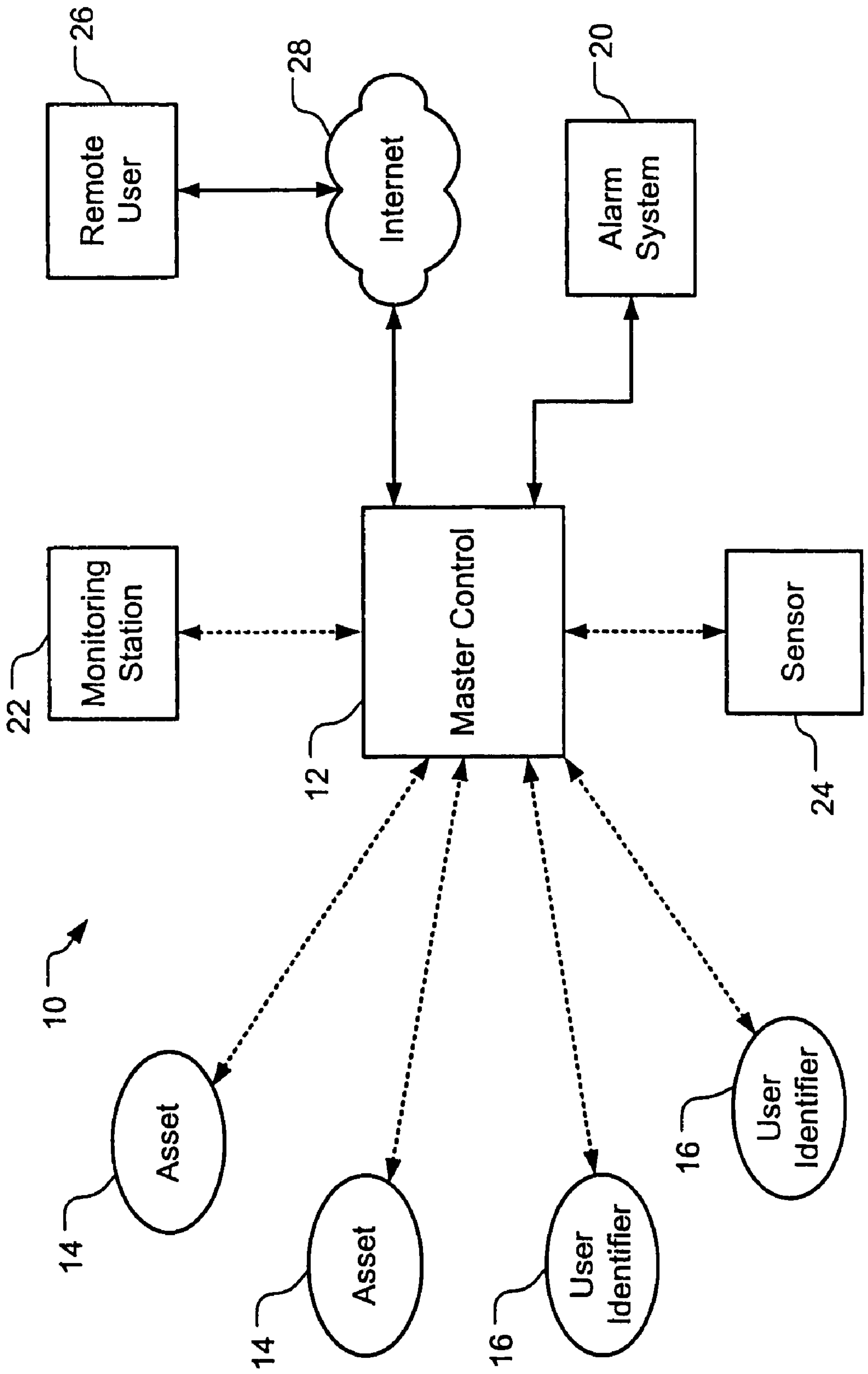
FIG. 3 is a functional block diagram of the asset monitoring and security system of FIG. 1.

Referring now to FIG. 3, in addition to communicating with assets 14 and user identification devices 16, the master control device 12 communicates with a sensor module 24. The sensor module 24 includes one or more sensors that detect changes in conditions within the defined area 17. For example, if the assets 14 are stored in a container, the sensor module 24 may include one or more vibration sensors that detect a breach into the container. Alternatively, the sensor module 24 may include one or more motion sensors that detect movement within a container. For example, the motion sensors may include ultrasonic sensors, infrared sensors, and/or laser light sensors. The master control device 12 may initiate an alarm event in response to a security breach detected by the sensor module 24.

The master control device 12 communicates with an alarm module 20. The alarm module 20 diagrammatically represents any of a number of alarms that the master control device 12 may activate when the master control device 12 initiates the alarm event. The alarm module 20 illustrated in FIG. 3 interfaces with alarm indicators that may be perceived by a large number of users within the defined area 17. For example, the alarm module 20 may activate a siren during an alarm event that may be perceived throughout the defined area 17. The alarm module 20 may also activate one or more elements of site lighting that illuminate a job site location. For example, the alarm module 20 may repeatedly flash lights included in elements of site lighting to attract visual attention during an alarm event.

The master control device 12 also communicates with a remote monitoring system 22. The master control device 12 may transmit an alarm message to the remote monitoring system 22 to indicate that a security breach has been detected. An operator of the remote monitoring system 22 may take corrective action in response to the alarm message or may contact appropriate law enforcement authorities or site supervisors. The remote monitoring station may also automatically contact a supervisor at a local or remote location via telephone, pager, e-mail, text messaging, and/or other forms of communication.

The master control device 12 and a remote user device 26 communicate with a distributed communications system 28 such as the Internet. This allows the master control device 12 to transmit/receive data to/from the remote user device 26. For example, the remote user device 26 may be a mobile phone, a personal digital assistance (PDA), a personal computer, or another device. In an exemplary embodiment, the remote user device 26 controls the master control device 12 via an asset monitoring system with web-enabled functionality. The web site may graphically display a job site inventory as well as the current status and location of users and assets 14.

Figure 4:
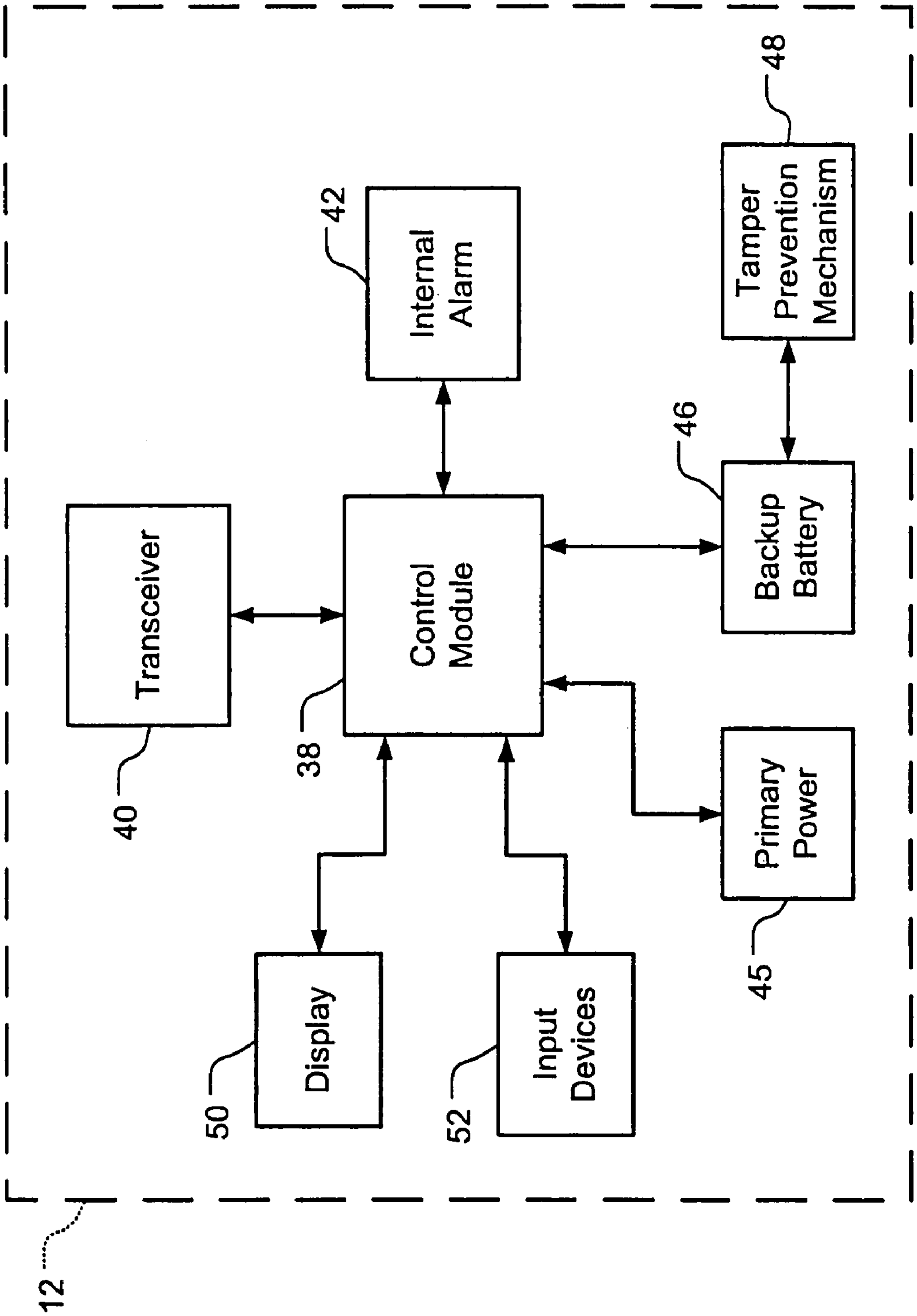
FIG. 4 is a functional block diagram of the master control device in FIG. 1.

Referring now to FIG. 4, the master control device 12 is illustrated in further detail. The master control device 12 includes a control module 38 that communicates with a transceiver 40. The control module 38 utilizes the transceiver 40 to communicate with the assets 14 and the user identification devices 16. The transceiver 40 may also be used to communicate with the remote monitoring system 22. For example, the control module 38 may use the transceiver 40 to communicate with the remote monitoring system 22 and/or the assets 14 and user identification devices 16 via radio frequency (RF) signals.

Those skilled in the art can appreciate that the transceiver 40 may wirelessly communicate with devices by other means including cellular and satellite communications systems. Additionally, while a single transceiver 40 is illustrated in FIG. 4, the master control device 12 may utilize two or more transceivers to communicate with the remote monitoring system 22, the assets 14, and the user identification devices 16. For example, the master control device 12 may utilize a first transceiver with a relatively short range to communicate with the assets 14 and user identification devices 16. At the same time, the master control device may utilize a second transceiver with a relatively large range to communicate with the remote monitoring system 22.

In an exemplary embodiment, the master control device 12 is enclosed within a housing. The housing may be configured to be mounted on a surface of a container. For example, the housing may be mounted on a surface of a storage container to monitor assets 14 that are stored in the container. Alternatively, the housing may be configured to be utilized as a hand-held device. In this case, the control module 38 may detect the positions of assets 14 and user identification devices 16 relative to the position of the control module 38 or relative to the defined area 17. In the event that the housing is used as a hand-held device, the master control device 12 may include an internal alarm module 42 that is different than the alarm module 20 in FIG. 3. For example, the hand-held device may include an independent visible indicator such as a light-emitting diode (LED), an audible indicator such as a speaker, or a vibration indicator that indicates a security breach by vibrating the hand-held device.

The master control device 12 includes a primary power supply 45 and a backup power supply 46. For example, the primary power supply 45 may be AC mains from a utility provider or a generator. Alternatively, the primary power supply 45 may be a portable power source such as a battery module, a solar power module, or a fuel cell module. The backup power supply 46 supplies power to the control module 38 when the primary power supply 45 fails or is depleted beyond a predetermined capacity. For example, the backup power supply 46 may also be a battery module or another power source. The backup power supply 46 communicates with a tampering prevention mechanism 48. The tampering prevention mechanism 48 prevents unauthorized tampering with the backup power supply 46. For example, the control module 38 may initiate an alarm event when the backup power supply 46 is removed from the master control device 12 and while the tampering prevention mechanism 48 is enabled.

The control module 38 communicates with a display module 50 and one or more input devices 52. For example, the display module 50 may be part of a control panel when the housing is mounted on a surface of a storage container. In an exemplary embodiment, the display module 50 displays an identifying picture and identifiable name of an asset 14 during an alarm event associated with the asset to aid in identifying and locating the asset. In the event that the housing is configured as a hand-held device, the display module 50 may include a liquid crystal display (LCD) screen. The input devices 52 may include a touch screen, a mouse, a keyboard, or another input device when the housing is mounted on the surface of a storage container. In the event that the housing is configured as a hand-held device, the input devices 52 may include actuator buttons, a touch screen, or other input devices.

As discussed above, users may manipulate the input devices 52 during an asset 14 check-out process to become associated with a particular asset 14. For example, a user may be required to select a desired asset(s) 14 followed by input of a username and password. Since the control module 38 includes a list of authorized users and associated privileges for the assets 14, the master control device 12 immediately detects when a user attempts to check-out an asset 14 that the user is not authorized to posses and/or use. Therefore, depending on the privileges afforded to a user for a particular asset 14, the master control device 12 may initiate an alarm event whenever the user exceeds the privileges for a given asset 14.

As discussed above, the master control device 12 may determine approximate distances to assets 14 or user identification devices 16 based on the signal strength of an identification signal. Additionally, the master control device 12 may determine relative directions of the assets 14 and user identification devices 16 in a number of ways. The master control device 12 may utilize multiple antennas that are positioned in an antenna array to cover assigned portions of the defined area 17 and/or to utilize triangulation location methods. A single directional antenna may also be used. In this case, the antenna may need to be pointed in the general direction of the target to obtain a reading. Additionally, a more accurate positioning system such as a global positioning system (GPS) may be utilized to locate the assets 14 and user identification devices 16. Other methods for determining distances between devices that establish wireless communications are well-known in the art.

Figure 5:
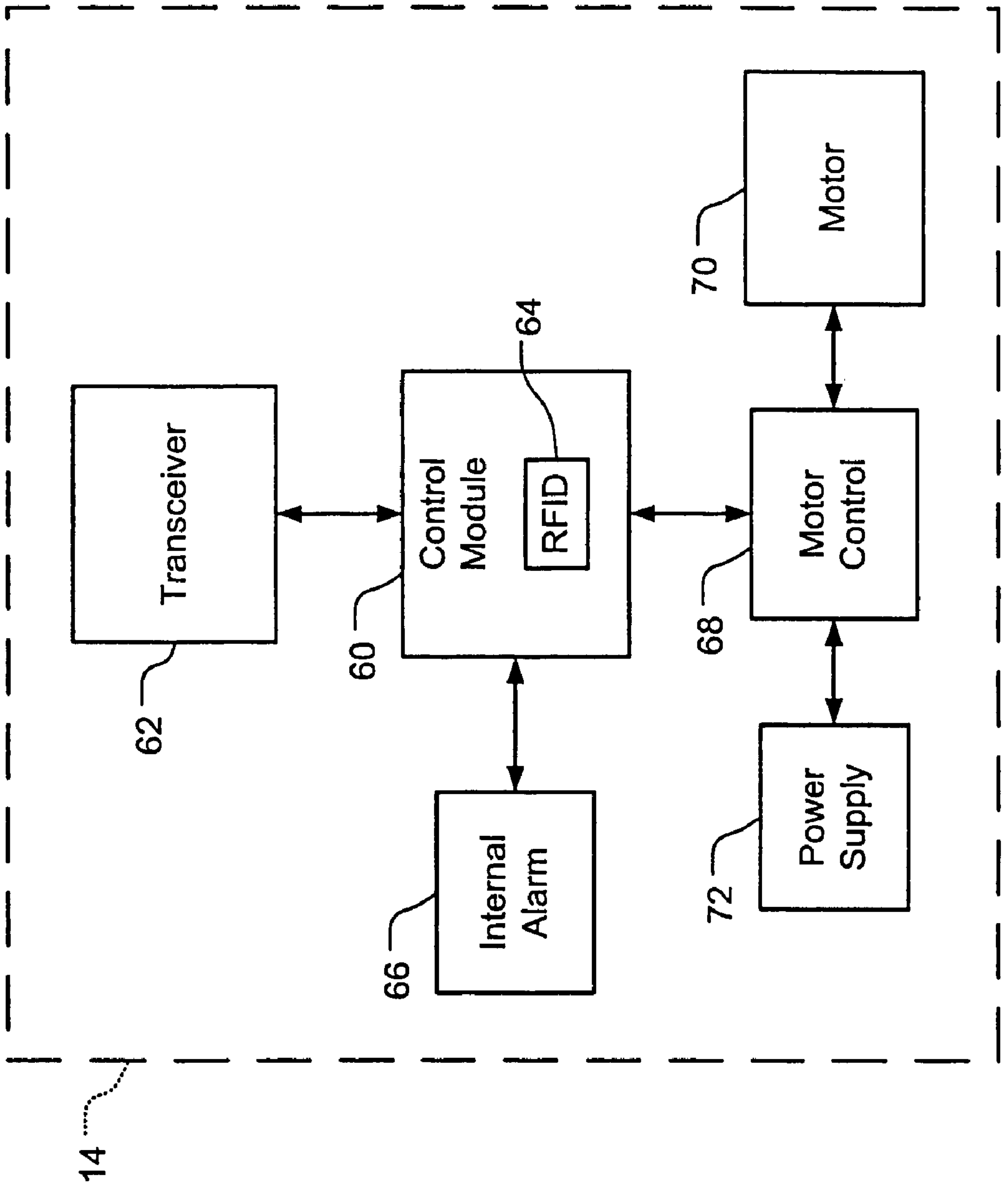
FIG. 5 is a functional block diagram of an exemplary asset.

Referring now to FIG. 5, an exemplary asset 14 is illustrated in further detail. The asset 14 includes a control module 60 that communicates with a transceiver 62. The control module 60 includes an RFID tag 64. For example, the RFID tag 64 may include an asset identification number that is stored in a memory location of the control module 60. The transceiver 62 transmits the asset identification number to the transceiver 40 of the master control device 12. The asset 14 includes an internal alarm module 66. In the event that an asset 14 is removed from a job site without authorization or another privilege is exceeded, the control module 60 may activate an alarm indicator associated with the alarm module 66 to aid in locating the asset 14. For example, the alarm module 66 may activate a siren in the asset 14 to assist in audibly determining the position of the asset 14.

In an exemplary embodiment, the asset 14 is a tool for use on an industrial job site location. The exemplary asset includes a lock-out mechanism 68. When activated, the lock-out mechanism 68 impedes use of the tool. For example, in the case of a power tool, the lock-out mechanism 68 may be a circuit that disables functional circuitry 70 of the power tool by interrupting current between a power supply 72 and the functional circuitry 70 of the power tool. It may be beneficial to ensure that an authorized user of a power tool is always within a predetermined distance of the power tool while in operation. Therefore, the master control device 12 may activate the lock-out mechanism 68 of the power tool when the authorized user of the power tool is not within a predetermined distance of the power tool. In the case of a non-power tool, the lock-out mechanism 68 may interrupt at least a portion of the mechanical motion or another feature of the tool.

In the case of the power tool and as shown in FIG. 5, the lock-out mechanism 68 may be implemented in a digital microcontroller and the functional circuitry 70 includes a motor of the power tool. The digital microcontroller includes a motor control circuit that controls the speed of the motor 70. When the digital microcontroller receives a lock-out request signal from the control module 60, the digital microcontroller refrains from activating the motor. For example, the digital microcontroller may ignore a user input such as the push of an actuation button to prevent activation of the power tool.

Alternatively, the lock-out mechanism 68 may be implemented to interface with an analog speed control circuit. In this case, the control module communicates with a circuit component in the analog speed control circuit to disable the motor. For example, the control module 60 may transmit a lock-out request signal to an interface circuit that communicates with a power semiconductor in the analog speed control circuit. The signal from the interface circuit may prevent on/off gating of the power semiconductor or the interface circuit may be configured to gate the power semiconductor off. For example, the power semiconductor may be implemented as a silicon-controller rectifier (SCR), a field-effect transistor (FET), and/or a triac.

In the case where an electronic asset 14 sign-out process is not implemented, the master control device 12 automatically detects a user that currently has possession of a given asset 14. In this case, the master control device 12 detects a user identification device 16 within a predetermined distance of an asset 14 to associate the asset 14 with a user to whom the user identification device 16 is assigned.

Figure 6:
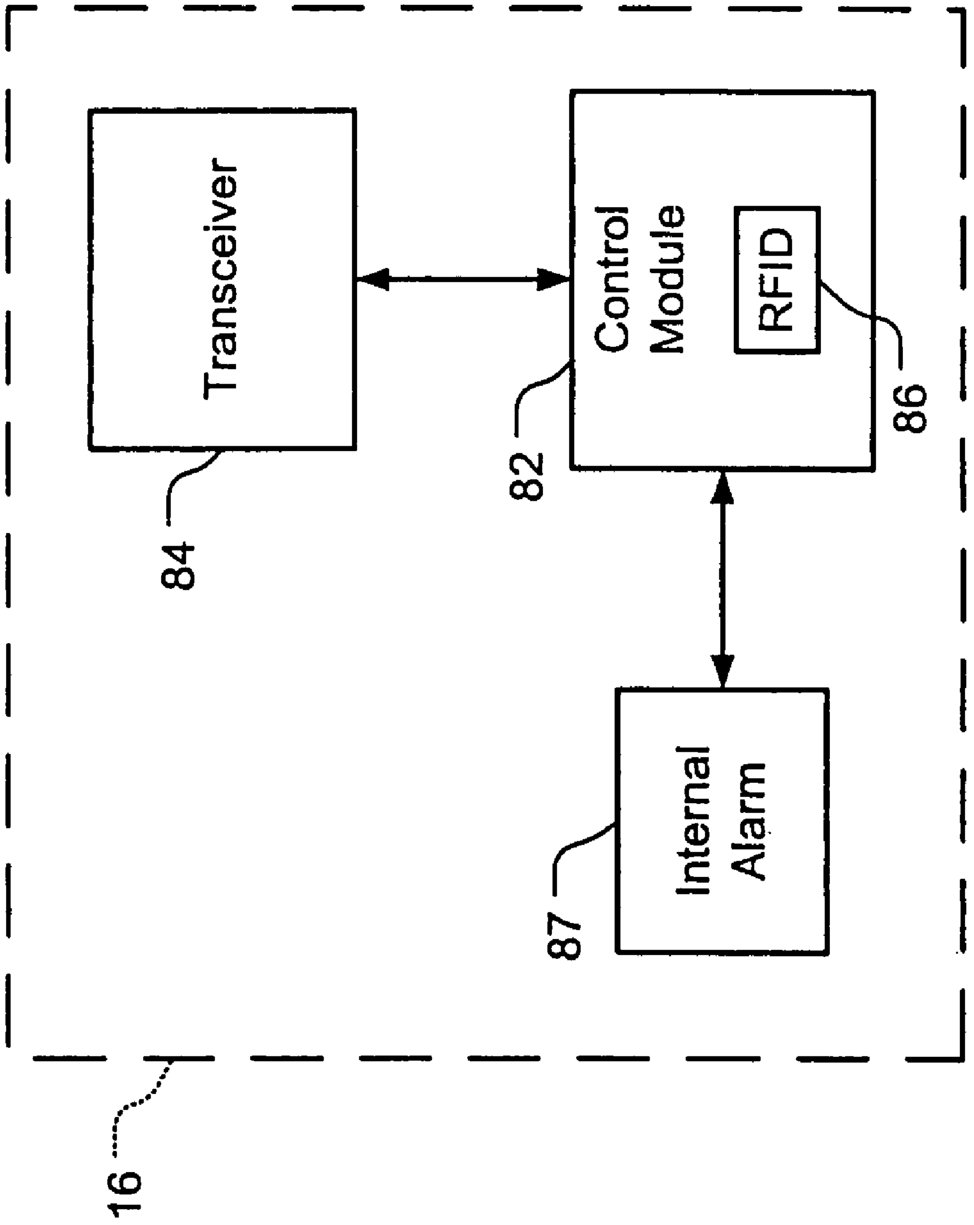
FIG. 6 is a functional block diagram of an exemplary user identification device.

Referring now to FIG. 6, an exemplary user identification device 16 that is associated with a user is illustrated in further detail. The user identification device 16 includes a control module 82 that communicates with a transceiver 84. As with the control module 60 of the exemplary asset 14 in FIG. 5, the control module 82 includes an RFID tag 86. The transceiver 84 transmits a user identification number that is assigned to the user to the transceiver 40 of the master control device 12. As with the exemplary asset 14 illustrated in FIG. 5, the exemplary user identification device 16 includes an internal alarm module 87. The master control device 12 associates one or more assets 14 with a user possessing a user identification device 16. Subsequently, the master control device may detect when an asset 14 assigned to the user is not within a predetermined distance of the user.

The control module 82 may then activate an alarm indicator associated with the alarm module 87 to alert the user. For example, the alarm module 78 may activate a visible indicator such as an LED, an audible indicator such as a siren, or another alarm indicator on the user identification device 16. In the case of an LED, the user may wear the user identification device 16 so that the LED is clearly visible to the user. For example, the user may wear the user identification device 16 on a wrist. The control module 82 may also activate an alarm indicator associated with the alarm module 87 when other privileges are exceeded by the user. For example, the control module 82 may activate an alarm indicator when the user moves outside of the defined area 17 with an asset 14 when the user is not authorized to remove the asset 14 from the defined area 17.

In an exemplary embodiment, a user manually specifies the predetermined distance an asset 14 may be located from the user before the control module 82 activates an alarm indicator. For example, the user may adjust the predetermined distance with a dial or switch on the user identification device 16. Other than the alarm module 87, the components of the user identification device 16 shown in FIG. 6 illustrate the minimum required components for an asset 14 in order to transmit identification signals to the master control device 12. All that is needed is a transceiver 84 and a data store 82 sufficient to store a unique identifier 86 that the transceiver 84 is capable of transmitting.

Figure 7:
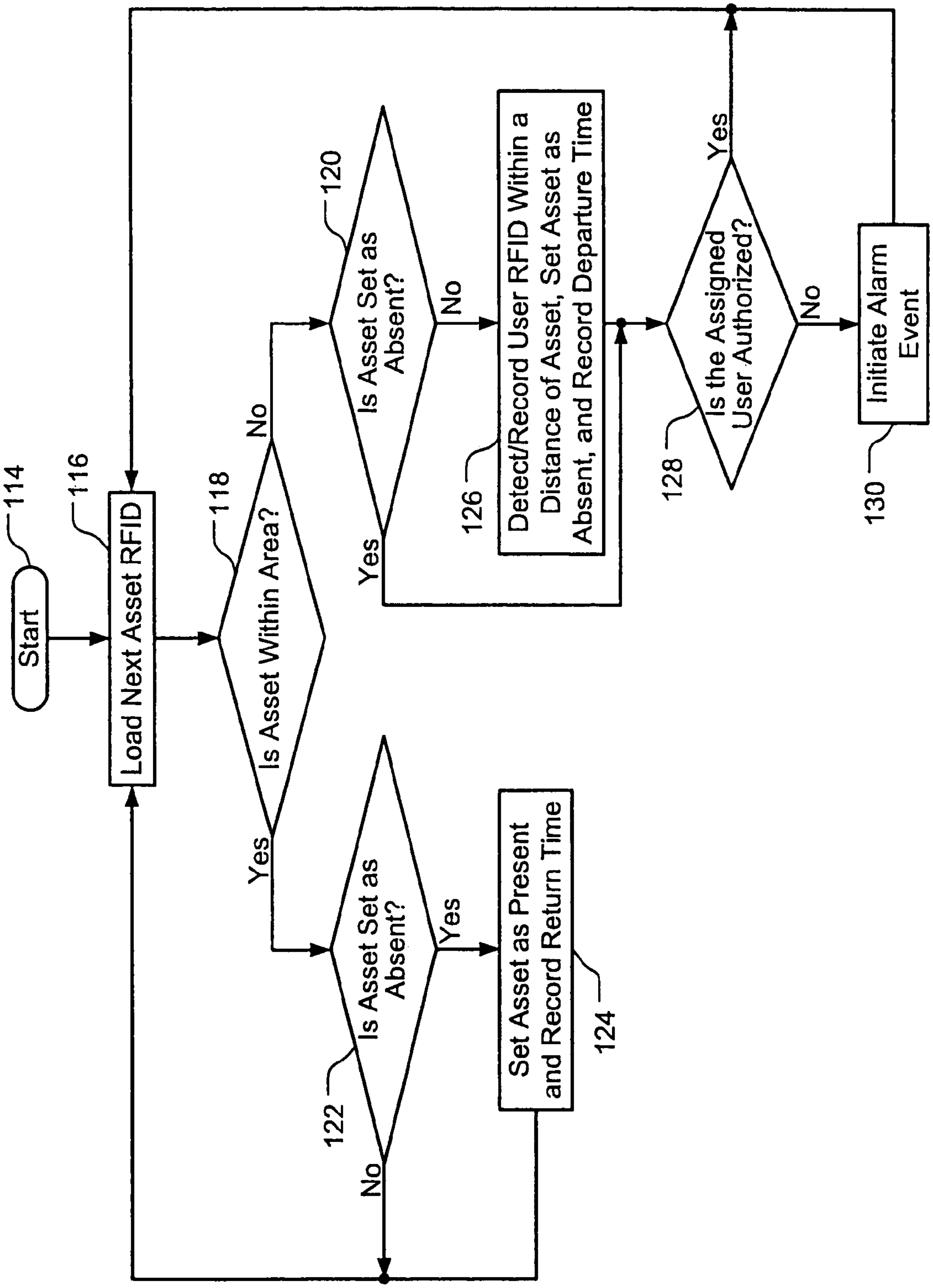
FIG. 7 is a flowchart illustrating steps performed by the master control device to detect unauthorized removal of assets from a defined area.

Referring now to FIG. 7, the master control device 12 continuously detects the positions of the assets 14 and user identification devices 16 in the defined area 17. A privilege assigned to a user with respect to a particular asset 14 may dictate whether the user may remove the asset 14 from the defined area 17. If such a user without permission removes the asset 14 from the defined area 17, the master control device 12 may initiate an alarm event. In order to keep detailed records of asset removal, the master control device 12 may record the date and time that an asset 14 is removed and/or returned to the defined area 17.

In an exemplary embodiment, the master control device 12 determines whether assets 14 are within the defined area 17 by cycling through known assets 14 in a predetermined order. Alternatively, the master control device 12 may cycle through the assets 14 in an order determined by priority. As shown in FIG. 7, the master control device 12 executes an asset removal algorithm that begins in step 114. In step 116, the master control device 12 detects the location of an asset 14. In step 118, control determines whether the asset 14 is within the defined area 17. If false, control proceeds to step 120. If true, control determines whether the asset 14 is set as absent from the defined area 17 in step 122.

An asset 14 is set as absent when the master control device 12 has determined that the asset 14 is outside of the defined area 17. If false, control returns to step 116. If true, the master control device 12 sets the asset 14 as present and records the current date and time in step 124. The master control device 12 first sets an asset 14 as present when the asset 14 is returned to the defined area 17 from outside of the defined area 17. Control proceeds from step 124 to step 116. For example, the current date and time may be stored by the master control device 12 in the database stored in the data storage device.

In step 120, control determines whether the asset 14 is set as absent. If false, the master control device 12 records the user to whom the asset 14 is currently checked-out to or assigned in step 126. For example, the master control device 12 may determine that a particular user is assigned to an asset

14 when the user identification device 16 of the user is within a predefined distance of the asset 14. For example, a minimum distance of three feet may be required between the asset 14 and user identification device 16 before the master control device 12 assigns the asset 14 to the user. Alternatively, the master control device 12 may already have the name of the user to whom the asset 14 is assigned stored in a database from an electronic sign-out process. The master control device 12 also sets the asset 14 as absent in step 126 and records the current date and time.

Control proceeds from step 126 to step 128. Additionally, if the asset 14 is already set as absent in step 120, control bypasses step 126 and proceeds to step 128. In step 128, control determines whether the user to whom the asset 14 is assigned has exceeded any allowed privileges. If true, control returns to step 116. If false, the master control device 12 initiates an alarm event in step 130 and control returns to step 116.

Figure 8:
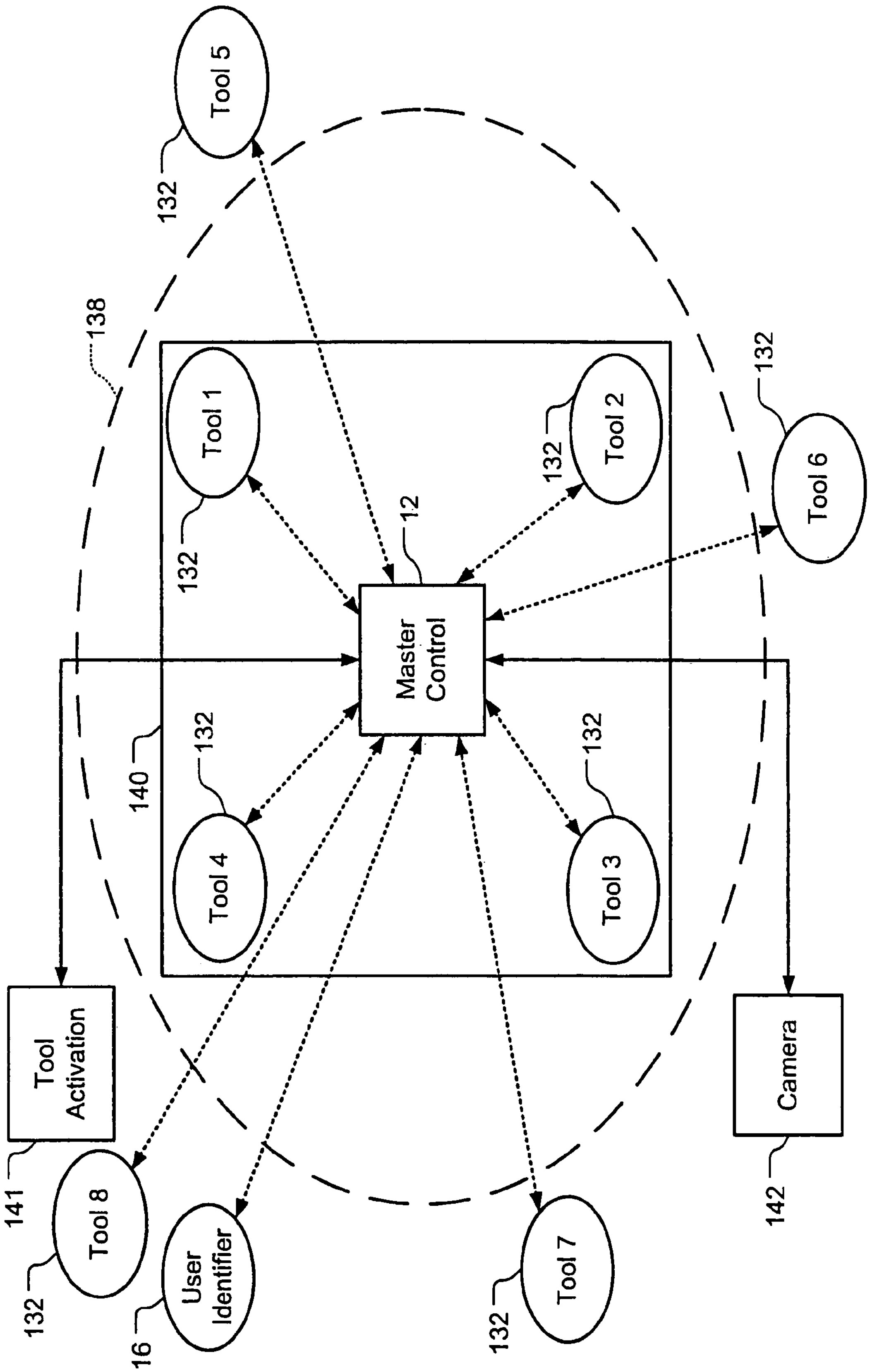
FIG. 8 illustrates an asset monitoring and security system including a master control device that monitors assets housed in a container while the assets are not in use.

Referring now to FIG. 8, the master control device 12 monitors the presence of tools 132 within a predefined monitoring area 138 such as a container 140. For example, the container 140 may be a storage container that houses tools 132 on an industrial job site. Alternatively, the container 140 may be a trailer that is attached to a truck or another vehicle for portable use. The master control device 12 is capable of determining when the one or more of the tools 132 is located beyond the predefined monitoring area 138. For example, the predefined monitoring area 138 is set approximately equal to the size of the container 140. Therefore, the master control device 12 ensures that only authorized users remove tools 132 from the container 140.

The master control device 12 may utilize multiple defined areas to monitor tools 132 in different locations. For example, a first defined area 138 may be approximately equal to the size of a storage container 140, and a second defined area 17 may be approximately equal to the size of a job site location. Two or more monitoring areas may be close in size so that the master control device 12 is capable of providing a warning when a tool 132 is approaching the boundary of a larger monitoring area. Additionally, the master control device 12 may utilize monitoring areas of different sizes for different tools 132.

The master control device 12 is capable of performing an inventory check on all local tools 132 at a time when the tools 132 are intended to be stored in the container 140. For example, the master control device 12 may be mounted on a surface of the container 140. In this case, a control panel or hand-held device may be utilized to communicate with the master control device 12. In an exemplary embodiment and in the case of power tools 132, the master control device 12 communicates with a tool activation device 141. The tool activation device 141 may also be mounted on a surface of the container 140. Alternatively, the tool activation device 141 may be a stand-alone device or may be integrated into a single device with the master control device 12.

The tool activation device 141 is capable of activating and/or deactivating lock-out mechanisms 68 in power tools 132. In the case where an electronic sign-out process for power tools 132 is utilized, the tool activation device 141 activates/deactivates the lock-out mechanisms 68 of power tools 132 when the power tools 132 are checked-out by authorized users. A user may bring a tool 132 within a predetermined distance of the tool activation device 141 to activate/deactivate the lock-out mechanism 68 of the power tool 132. For example, a minimum distance of six inches may be required. The lock-out mechanism 68 may include an internal magnetic switch that is triggered by the tool activation device 141 or another mechanism.

In another exemplary embodiment, the master control device 12 detects whether an authorized user is within a predetermined distance of the power tool 132 before the tool activation device 141 activates/deactivates the lock-out mechanism 68 of the power tool 132. In this case, an electronic sign-out process for power tools 132 may not be required. In another exemplary embodiment, the tool activation device 141 is not required. In this case, the master control device 12 periodically detects the presence of an authorized user of the power tool 132 within a predetermined distance of the power tool 132. The lock-out mechanism 68 remains deactivated while an authorized user of the power tool 132 is within the predetermined distance of the power tool 132. The master control device 12 activates the lock-out mechanism 68 when an authorized user is not within the predetermined distance of the power tool 132.

The master control device 12 communicates with a camera module 142. The camera module 142 may be mounted on a surface of the container 140 or may be a stand-alone device. The camera module 142 includes one or more digital cameras that are positioned to capture a digital image of a user when the user removes a tool 132 from the predefined monitoring area 138. For example, one or more cameras may be directed towards the opening of a storage container 140 or a trailer that houses a plurality of tools 132. The master control device 12 monitors a position of a tool 132, and the camera module 142 captures a digital image of a user of the tool 132 when the user moves the tool 132 beyond the predefined monitoring area 138. Additionally, when the electronic sign-out process is implemented, the camera module 142 may capture a digital image of a user as the user checks out one or more assets 14. For example, capturing a digital image of the user may be a required step in the electronic check-out process.

Referring now to FIGS. 9A-9B, the master control device 12 maintains an exemplary asset status database 144. An assignment status identifies the current user to whom an asset 14 is currently assigned. For example, the master control device 12 may determine that a user possesses a device when a user identification device 16 assigned to the user is within a predetermined distance of the asset 14. Alternatively, the master control device 12 may employ an electronic sign-out process. In this case, users enter usernames, passwords, and desired assets 14 into a control panel to authorize use of the assets 14 or removal of the assets 14 from the defined area 17.

The asset status database 144 includes an activation status for each asset 14. The activation status indicates whether the lock-out mechanisms 68 of individual power tools 132 are activated or deactivated. An availability status indicates whether the asset 14 is checked out under the electronic sign-out process described above or currently assigned to a user. For example, the master control device 12 may initiate an alarm event when an asset 14 is not checked out and greater than a predetermined distance from the master control device 12. A distance status indicates estimated distances to respective assets 14.

A status field indicates whether the master control device 12 has initiated an alarm event with respect to an individual asset 14. For example, the master control device 12 may initiate an alarm event relating to an individual power tool when the power tool is out-of-range and the lock-out mechanism 68 of the power tool has not been deactivated. A return time field indicates the last date and time that an asset 14 was returned to the defined area 17 from outside of the defined area 17. An operating time field indicates the current consecutive amount of time that the functional circuitry 70 of an asset 14 has been running. For example, due to operating tolerances of specific assets 14, it may be beneficial to limit the operating time of functional circuitry 70 for particular assets 14. A departure time field indicates the last date and time that an asset 14 was either electronically checked-out or removed from the defined area 17.

A due date field indicates a date and time by which an asset 14 must either be electronically checked-in or returned within the defined area 17 before the master control device 12 initiates an alarm event with respect to the asset 14. For example, an authorized user may have permission to remove one or more assets 14 from the defined area 17 for a limited amount of time. Those skilled in the art can appreciate that the master control device 12 may utilize any or all of the database fields illustrated in FIGS. 9A-9B as well as other data items that may be beneficial for asset monitoring and security.

Figure 10:
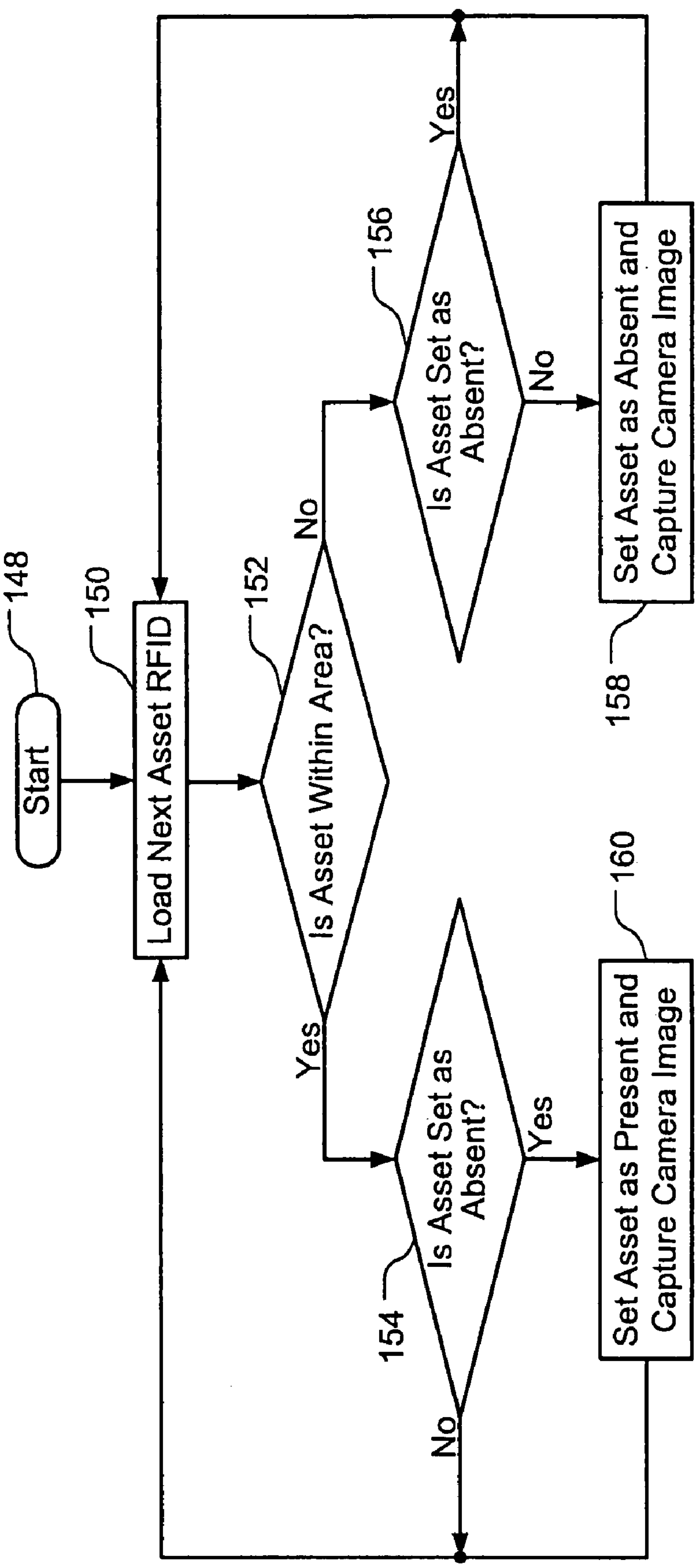
FIG. 10 is a flowchart illustrating steps performed by the master control device of FIG. 8 to capture images of users while the users remove assets from the container.

Referring now to FIG. 10, the master control device 12 may record the current user to whom a tool 132 is assigned as well as the current date and time to store in the database of the data storage device. The master control device 12 may determine the current user to whom a tool 132 is assigned in conjunction with the electronic sign-out process described above. Alternatively or additionally, the master control device 12 may assign a tool 132 to a user that is within a predetermined distance of the tool 132 when the tool 132 is moved beyond the predefined monitoring area 138.

In an exemplary embodiment, the camera module 142 captures an image of a user of a tool 132 when the user removes the tool 132 from the defined area 17 and also moves the tool 132 back within the predefined monitoring area 138. In this case, the master control device 12 also records the current date and time to store in the database. The master control device 12 may transmit the image captured by the camera module 142 to the remote monitoring station 22 and/or the remote user device 26 to inform a supervisor when a tool 132 is removed from and/or returned to the container 140. As shown in FIG. 10, a camera module algorithm that is executed by the master control device 12 begins in step 148. In step 150, the master control device 12 detects the position of a tool 132.

In step 152, control determines whether the tool 132 is within the predefined monitoring area 138. If true, control proceeds to step 154. If false, control determines whether the tool 132 is set as absent in step 156. If true, control returns to step 150. If false, the master control device 12 sets the tool 132 as absent in step 158. Additionally, the master control device 12 instructs the camera module 142 to capture a digital image in step 158 and control returns to step 150. In step 154, the master control device 12 determines whether the tool 132 is set as absent. If false, control returns to step 150. If true, the master control device 12 sets the asset 14 as present in step 160. Additionally, the master control device 12 instructs the camera module 142 to capture a digital image in step 160 and control returns to step 150.

Figure 11:
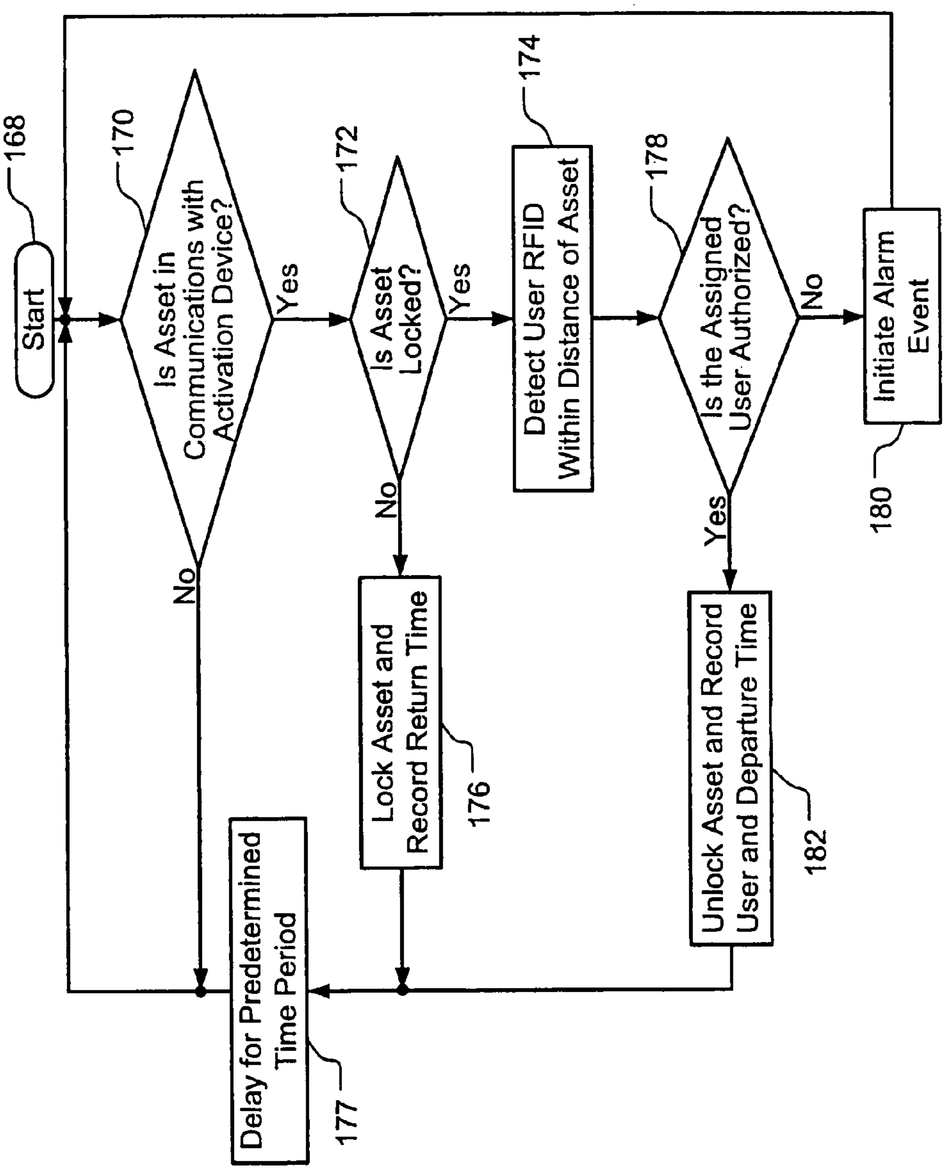
FIG. 11 is a flowchart illustrating steps performed by the master control device of FIG. 8 to activate and/or deactivate lock-out mechanisms included in assets from the container that communicate with a tool activation device.

Referring now to FIG. 11, a privilege assigned to a user with respect to a tool 132 may dictate whether the user has the ability to use the tool activation device 141 to activate/deactivate an internal lock-out mechanism 68. A tool activation algorithm that is executed by the master control device 12 begins in step 168. In step 170, control determines whether a tool 132 is within a predetermined distance of the tool activation device 141. If false, control loops to step 170. If true, control determines whether the lock-out mechanism 68 of the tool 132 is activated in step 172. If true, control proceeds to step 174.

If false, the tool activation device 141 activates the lock-out mechanism 68 of the tool 132 in step 176. Additionally, the master control device 12 records the current date and time to store in the database of the data storage device in step 176 and control proceeds to step 177. In step 177, the master control device 12 delays for a predetermined period of time before returning control to step 170. The master control device 12 initiates the delay period in step 177 to prevent a lock-out mechanism 68 of a tool 132 from continuously being activated and then deactivated while the tool 132 is in communications with the tool activation device 141.

In step 174, the master control device 12 detects a user within a predetermined distance of the tool 132. Alternatively, control may bypass step 174 when an electronic sign-out process is utilized. In this case, the master control device 12 already knows to which user a tool 132 is assigned. In step 178, control determines whether the user is authorized to possess and/or use the tool 132. If false, control proceeds to step 180. If true, the tool activation device 141 deactivates the lock-out mechanism 68 of the tool 132 in step 182. Additionally, the master control device 12 records the user of the tool 132 and the current date and time to store in the database in step 182 and control proceeds to step 177. In step 180, the master control device 12 initiates an alarm event associated with the tool 132 and control returns to step 170.

As shown in FIG. 11, the tool activation device 141 only deactivates the lock-out mechanism 68 of a tool 132 when the tool 132 is checked-out or possessed by an authorized user of the tool 132. However, in an exemplary embodiment, the tool activation device 141 activates the lock-out mechanisms 68 of tools 132 regardless of whether the tools 132 are checked-out to or possessed by authorized users of the tools 132. In other words, there may be no adverse consequences in allowing any user to disable the functional circuitry 70 of a tool 132.

Figure 12:
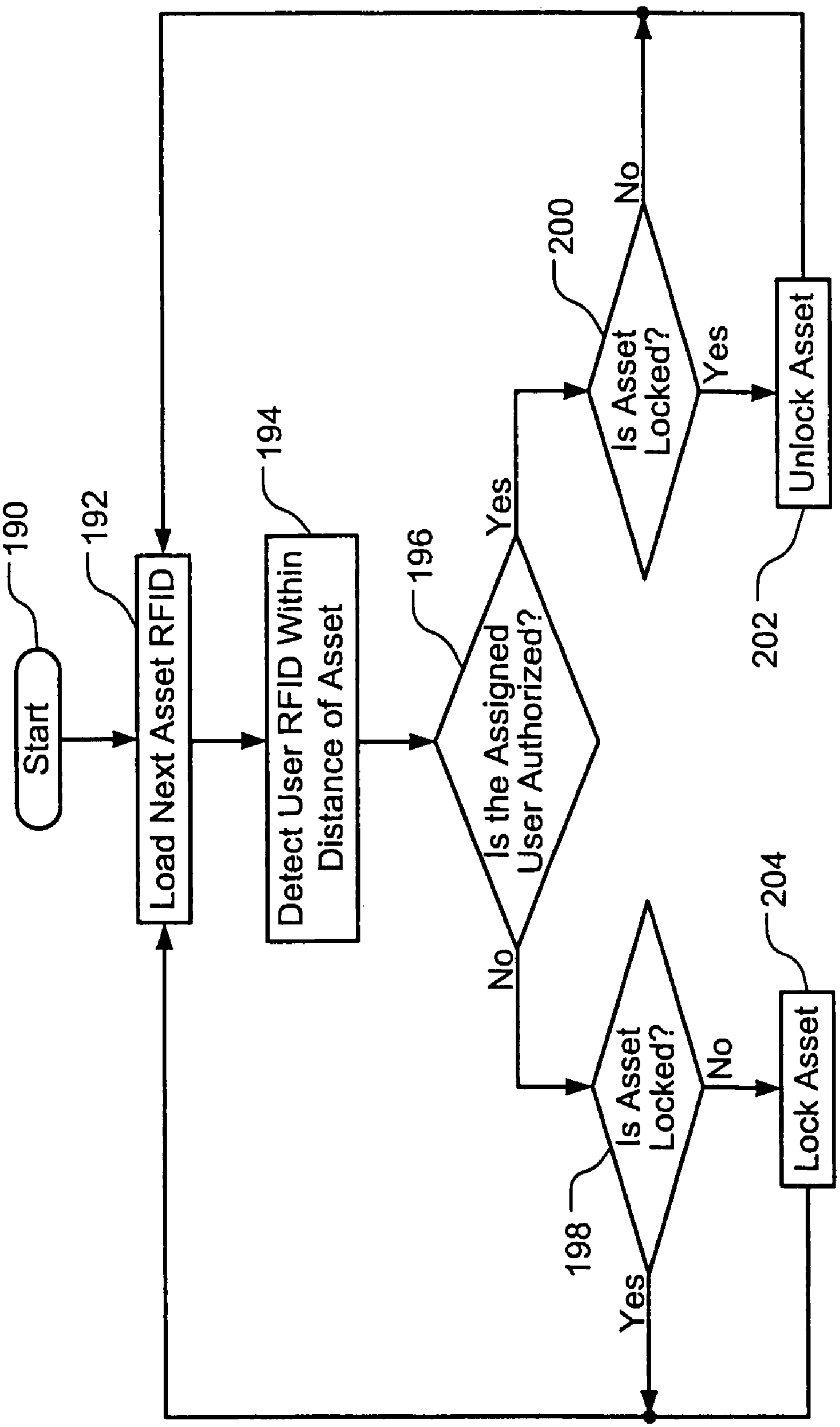
FIG. 12 is a flowchart illustrating steps performed by the master control device of FIG. 8 to activate and/or deactivate the lock-out mechanisms based on the presence of authorized users of the assets.

Referring now to FIG. 12, the master control device 12 may institute a number of corrective procedures when privileges are exceeded with respect to tools 132 that include lock-out mechanisms 68. In the case where an electronic sign-out process is employed, the master control device 12 may require that the lock-out mechanism 68 of a tool 132 is deactivated by the tool activation device 141 immediately following check-out. This ensures that an authorized user of the tool 132 is deactivating an associated lock-out mechanism 68 personally. Alternatively, the master control device 12 may continuously search for authorized users of a tool 132 within a predetermined radius of the tool 132.

As long as a user that has privileges to operate the tool 132 is within the predetermined radius, the lock-out mechanism 68 of the tool 132 remains deactivated. As an added security measure, the master control device 12 may automatically deactivate the lock-out mechanism 68 of a tool 132 when the tool moves outside of the defined area 17. This prevents an unauthorized user from obtaining a tool 132 with a deactivated lock-out mechanism 68 while the tool 132 is outside of the defined area 17. As shown in FIG. 12, an automatic tool activation algorithm that is executed by the master control device 12 begins in step 190. The automatic tool activation algorithm is utilized by the master control device 12 when the asset monitoring and security system 10 does not include the tool activation device 141. In step 192, the master control device 12 detects the position of a tool 132.

In step 194, the master control device 12 detects a user identification device 16 that is within a predetermined distance of the tool 132. In step 196, control determines whether the user to whom the user identification device 16 is assigned is authorized to use and/or possess the tool 132. If false, control proceeds to step 198. If true, control determines whether the lock-out mechanism 68 of the tool 132 is activated in step 200. If false, control returns to step 192. If true, the master control device 12 deactivates the lock-out mechanism 68 of the tool 132 in step 202 and control returns to step 192.

In step 198, control determines whether the lock-out mechanism 68 of the tool 132 is activated. If true, control returns to step 192. If false, the master control device 12 activates the lock-out mechanism 68 of the tool 132 in step 204 and control returns to step 192. Therefore, the master control device 12 periodically determines the presence of authorized users 16 within a predetermined distance of tools 132. The master control device 12 enables the functional circuitry 70 of the tools 132 when an authorized user is present and disables the functional circuitry 70 of the tools 132 when an authorized user is not present.

Figure 13:
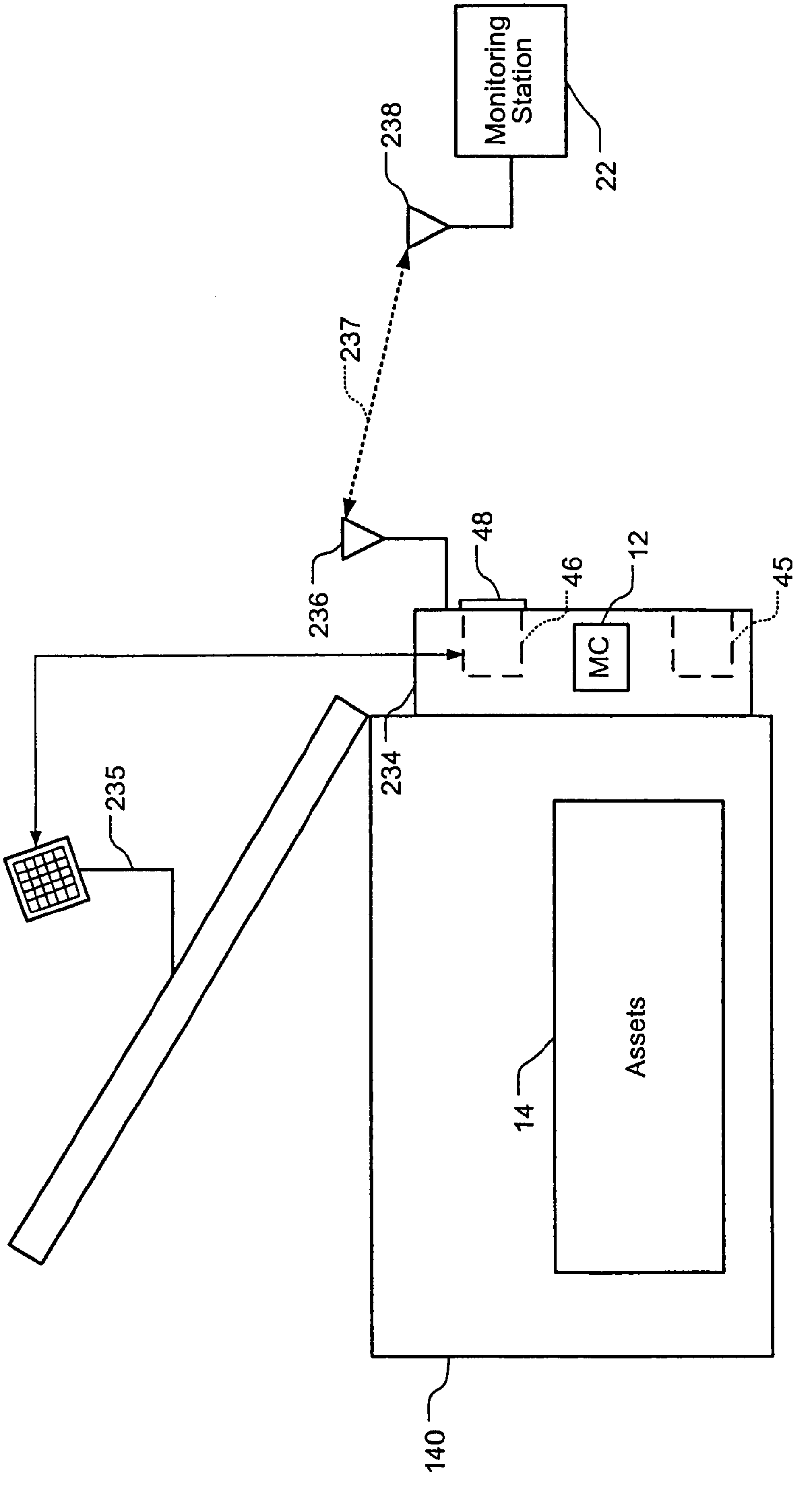
FIG. 13 illustrates a housing including the master control device mounted on a surface of a container and communicating with an auxiliary power source and a remote monitoring system.

Referring now to FIG. 13, the master control device 12 is enclosed within a housing 234 that is adapted to be mounted on a surface of a container 140 that houses assets 14. The master control device 12 includes the primary power supply 45 and the backup power supply 46. In an exemplary embodiment, the backup power supply 46 is only utilized when a capacity of the primary power supply 45 is less than a predetermined capacity. Since the backup power supply 46 may be required in critical situations, the tampering prevention mechanism 48 prevents unauthorized removal or tampering with the backup power supply 46. For example, a combination or key may be required to disable the tampering prevention mechanism 48 in order to remove the backup power supply 46.

Due to the portable nature of the container 140 and the housing 234, the primary power supply 45 may not always be an AC mains provided by a utility provider or a generator. In an exemplary embodiment, both the primary power supply 45 and the backup power supply 46 are rechargeable battery devices. In this case, the master control device 12 communicates with an auxiliary power source 235. The auxiliary power source 235 provides power to the primary power supply 45 and the backup power supply 46 in order to prevent a discharge condition in the primary power supply 45 and the backup power supply 46. The auxiliary power source 235 allows the primary power supply 45 and the backup power supply 46 to be charged when no AC mains is available. For example, the auxiliary power source 235 may be a solar power panel that generates current based on energy from the sun.

Voltage conversion circuitry located in either the housing 234 or the auxiliary power source 235 regulates the voltage output by the auxiliary power source 235 to a level suitable for the primary power supply 45 and the backup power supply 46. Alternatively, the auxiliary power source 235 may be a fuel cell that generates current from hydrogen. For example, a fuel cell may convert hydrogen and oxygen into electricity and water. However, a reliable and/or affordable source of hydrogen may not be available. In this case, an alternative fuel such as methanol may be utilized.

In an alternative exemplary embodiment, the auxiliary power source 235 functions solely as the primary power supply 45 with a rechargeable battery device as the backup power supply 46. In this case, the auxiliary power source 235 may power the master control device 12 while maintaining the backup power supply 46 at a float voltage. In this case, the master control device 12 may initiate an alarm event when the auxiliary power source 235 fails. This allows a user to repair or replace the auxiliary power source 235 or disconnect the backup power supply 46 before the backup power supply 46 enters a deep discharge condition.

FIG. 13 also illustrates communications between the master control device 12 and the remote monitoring system 22. The master control device includes an antenna 236 that transmits a signal 237 to an antenna 238 of the remote monitoring system 22. The signal 237 may be an alarm message, a digital image from the camera module 142, or another signal 237. In an exemplary embodiment, the remote monitoring system 22 simultaneously communicates with multiple master control devices 12 that monitor independent collections of assets 14. This allows the remote monitoring system conduct real-time monitoring of a large number of assets 14 across large distances.

Additionally, an authorized user may consult with the remote monitoring system 22 to determine the availability of specialized assets 14 such as tools 132 at other job site locations. For example, a contractor that operates at multiple job site locations may maintain a limited supply of a specific power tool 132. If the tool 132 is not being used while residing at a first job site location, an authorized user at a second job site location may request use and/or delivery of the power tool 132.

Figure 14B:
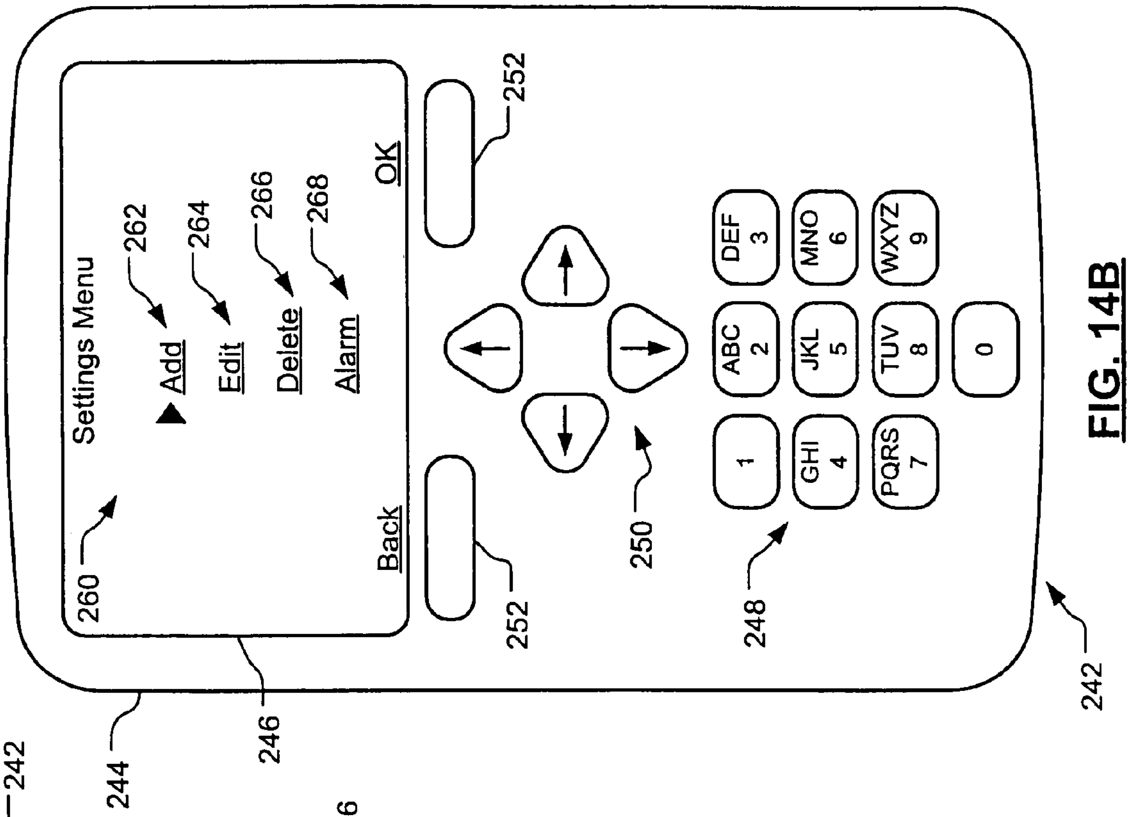
FIG. 14B illustrates an exemplary settings menu for the hand-held asset monitoring device.
Figure 14A:
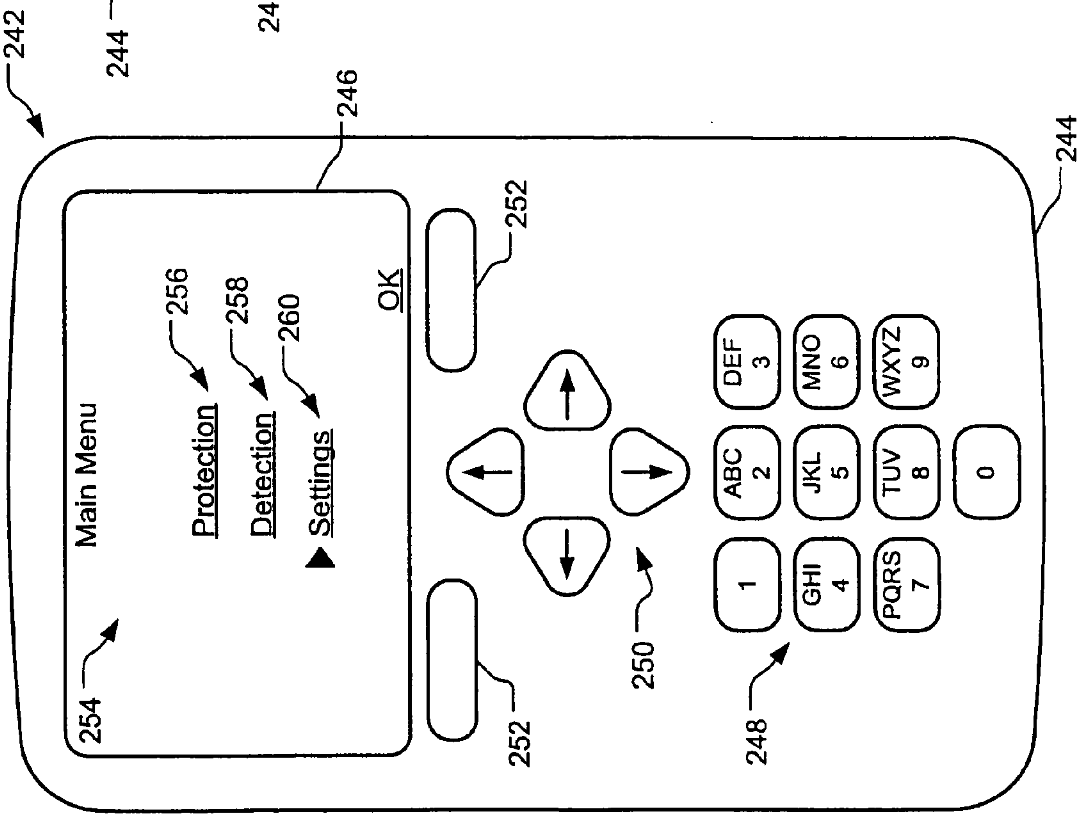
FIG. 14A illustrates an exemplary hand-held asset monitoring device including a main menu.

Referring now to FIG. 14A, an exemplary hand-held device 242 incorporating the master control device 12 includes a housing 244. An LCD screen 246 communicates information to a user of the hand-held device 242. The user inputs information to the hand-held device 242 in a number of ways. A numeric keypad 248 may be used to input numerical and/or alphabetical information. A directional pad 250 includes directional buttons that allow the user of the device to move a cursor or adjust a value on the LCD screen 246. Additionally, interactive buttons 252 allow the user to select between choices that are presented on the LCD screen 246.

The hand-held device 242 preferably executes an asset monitoring software program. In an exemplary embodiment, the hand-held device 242 is manufactured and/or sold with a plurality of associated RFID tags. The RFID tags may be fastened to or embedded in assets 14 such as power tools and construction materials. Additionally, peel-and-stick RFID tags may be used to monitor non-power tools. An exemplary main menu 254 for the asset monitoring program is shown in FIG. 14A. The main menu includes a protection option 256, a detection option 258, and a settings option 260.

A user selects the protection option 256 to monitor the status of assets 14 that are currently associated with the hand-held device 242. A user selects the detection option 258 to pin-point the exact location of an asset 14. For example, the strength of a signal that is received from an asset 14 may be displayed on the LCD screen 246 to assist in finding the exact location of the asset 14. A user selects the settings option 260 to adjust settings and preferences associated with operation of the asset monitoring software. A user of the device manipulates the directional buttons 250 and an interactive button 252 to select a desired option.

Referring now to FIG. 14B, an exemplary settings menu 260 for the asset monitoring program includes an add option 262, an edit option 264, a delete option 266, and an alarm option 268. The add option 262 allows the user to search for RFID tags that are associated with the hand-held device 242 and to input information relating to the asset 14 to which the RFID device is fastened. The edit option 264 allows the user to edit information that was previously entered through the add option 262. The delete option 266 allows the user to delete information about an asset 14 relating to a specific RFID that is associated with the hand-held device 242. The alarm option 268 allows the user to adjust the properties of an alarm event that is initiated by the master control device 12.

Figure 14D:
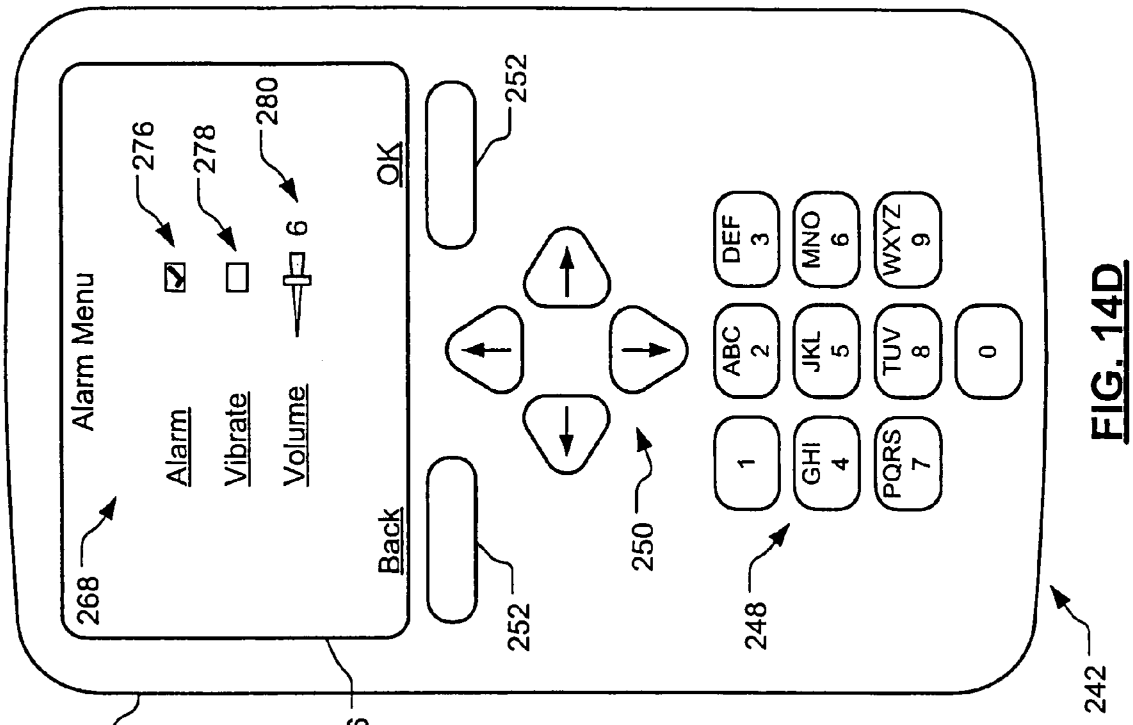
FIG. 14D illustrates an exemplary alarm menu for the hand-held asset monitoring device.
Figure 14C:
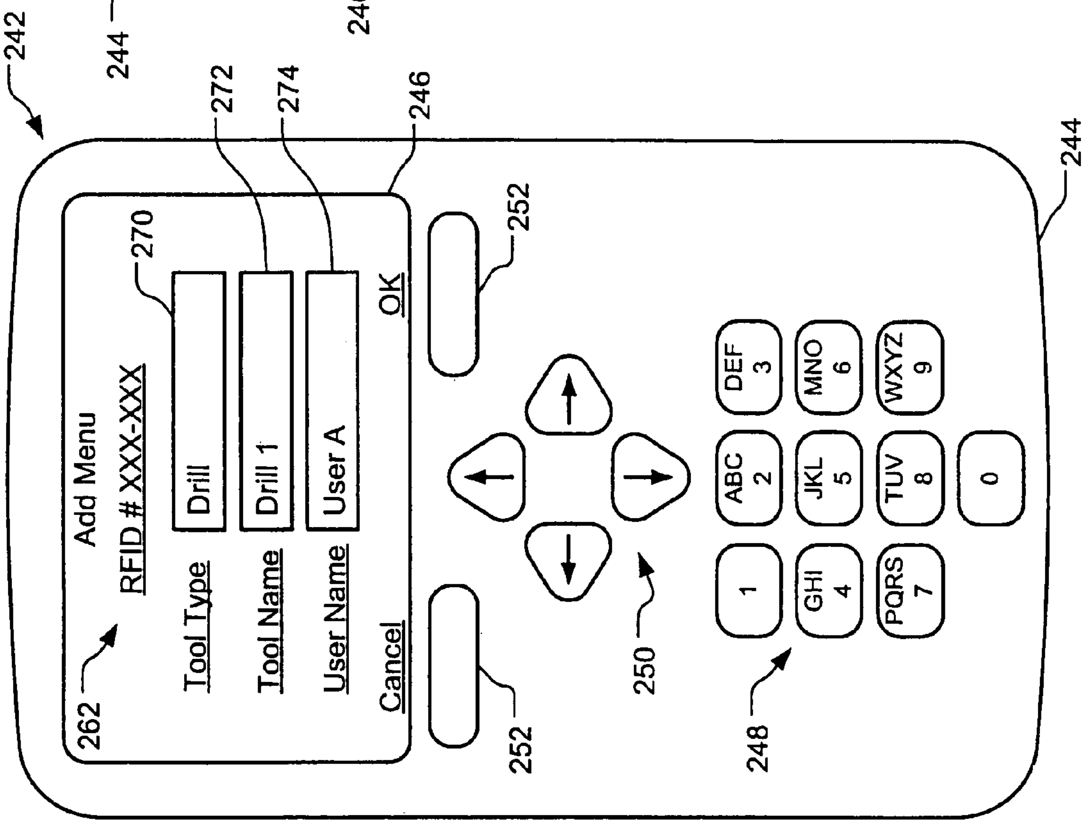
FIG. 14C illustrates an exemplary add menu for the hand-held asset monitoring device.

Referring now to FIG. 14C, an exemplary add menu 262 displays an RFID tag that is associated with the hand-held device 242 and that has not yet been configured. A unique identification number for the RFID tag is displayed. Within a tool type field 270, the user may identify a category to which the current asset 14 belongs. For example, in the case of tools, the user may select from drills, equipment, grinders, saws, and other tools. Within a tool name field 272, the user may designate a unique name for the asset 14. For example, the asset 14 belonging to the drill category in FIG. 14C has a tool name "Drill 1". Within a user name field 274, the user registering the current RFID tag may enter personal identifying information. For example, a user may enter a full name or an assigned username.

Referring now to FIG. 14D, an exemplary alarm menu 268 includes an alarm option 276, a vibrate option 278, and a volume setting 280. A user checks the alarm option 276 to enable an audible indicator 42 that is associated with the hand-held device 242. For example, the master control device 12 may activate the audible indicator 42 during an alarm event. A user checks the vibrate option 278 to enable a vibration indicator 42 that is associated with the hand-held device 242. For example, the vibration indicator 42 allows the master control device 12 to alert a user of the hand-held device 242 without producing an audible alert. The master control device 12 may activate the vibration indicator 42 during the alarm event. A user adjusts the volume setting 280 to adjust the volume of the audible indicator 42.

Figure 14E:
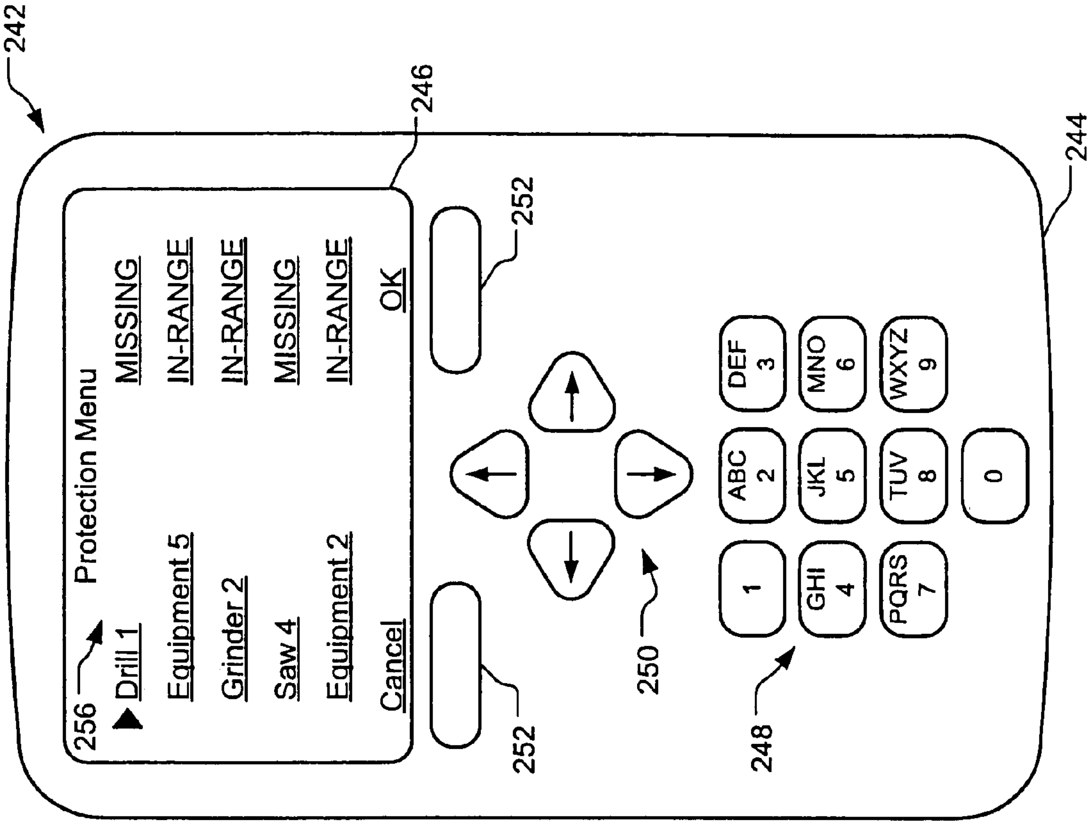
FIG. 14E illustrates an exemplary protection menu for the hand-held asset monitoring device.

Referring now to FIG. 14E, an exemplary protection menu 256 includes a list of all RFID tags that are currently registered with the hand-held device 242. In an exemplary embodiment, the RFID tags are listed by the tool name field 272 entered in the add menu 262. Each asset 14 is listed as either being in-range or missing. An asset 14 may be listed as missing when the asset 14 is beyond the predefined monitoring area 138. A user may select one of the assets 14 to obtain more specific information about that asset 14. For example, if an asset 14 is missing, the user may select the asset 14 to enter the detection menu 258 and attempt to detect the location of the asset 14. Alternatively, the user may set an allowable time for which the asset 14 may remain missing before the master control device 12 initiates an alarm event. For example, the user may set the allowable time equal to five minutes.

In an exemplary embodiment, the hand-held device 242 communicates with and is used in combination with the master control device 12. For example, the master control device 12 may monitor the positions of assets 14 relative to a central location. Once an asset 14 is identified as being located outside of the predetermined monitoring area 138, the hand-held device 242 may be used as a portable instrument to locate the asset 14. For example, the hand-held device 242 may also independently communicate with the assets 14 and determine positions of the assets 14 relative to the hand-held device 242.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power tool monitoring and security system, comprising:

at least power tool assigned a unique identifier stored in an embedded radio frequency identification (RFID) tag and operable to transmit an identification signal embodying the identifier over a wireless radio frequency (RF) communications link;

at least one user identification device assigned a unique identifier and operable to transmit an identification signal embodying the identifier over the wireless communication link;

a data store for maintaining a list of the power tools and privileges associated with the power tools for authorized users of the power tools; and a control unit adapted to receive identification signals from the power tools and the user identification device and determine positions of the power tools and the user identification devices within a job site location based on the identification signals, wherein the control unit associates a given power tool with a given user identification device when a distance between the given power tool and the given user identification device is less than a threshold and updates the data store with the associate between the given power tool and the given user identification device, wherein the control unit is further operable to initiate an alarm event when privileges associated with a given power tool for authorized users of the power tool are exceeded.

2. The power tool monitoring and security system of claim 1 wherein the data store maintains a list of users authorized to use the power tools and privileges associated with the power tools for each of the authorized users and wherein the control unit is operable to initiate an alarm event when privileges associated with a given authorized user for a given power tool are exceeded.

3. The power tool monitoring and security system of claim 2 wherein a privilege associated with an power tool for a given authorized user limits the authorized user to possession of the power tool within the job site location and wherein the control unit initiates the alarm event when the given authorized user possesses the power tool outside of the job site location.

4. The power tool monitoring and security system of claim 1 wherein the control unit generates a return time for an power tool when the power tool moves from outside of the job site location to within the job site location and wherein the control unit stores the return time in the data store.

5. The power tool monitoring and security system of claim 2 further comprises at least one RFID badge worn by a user, assigned a unique identifier, and operable to transmit an identification signal embodying the identifier to the control unit over a wireless RF communications link.

6. The power tool monitoring and security system of claim 5 wherein the control unit is adapted to receive identification signals from the RFID badges and monitor positions of the RFID badges within the job site location based on the identification signals from the RFID badges.

7. The power tool monitoring and security system of claim 6 wherein the control unit associates a power tool with a user when the control unit detects a RFID badge of the user within a predetermined distance of the power tool.

8. The power tool monitoring and security system of claim 7 wherein the RFID badge includes an alarm indicator and wherein the control unit activates the alarm indicator when a distance between the RFID badge and the power tool associated with the RFID badge is greater than a second predetermined distance.

9. The power tool monitoring and security system of claim 1 further comprises a data input device adapted to receive a personal identifier input by a user that uniquely identifies the user and a list of desired power tools input by the user that the user desires to possess during an power tool check-out process.

10. The power tool monitoring and security system of claim 9 wherein the data input device is operable to transmit the personal identifier and the list of desired power tools to the data store and wherein the control unit associates a given power tool with the user based on the personal identifier and the list of desired power tools.

11. The power tool monitoring and security system of claim 9 further comprises a camera that communicates with the control unit and that captures an image of a user at least one of during and/or after the power tool check-out process.

12. The power tool monitoring and security system of claim 1 wherein a privilege associated with a given power tool for authorized users of the power tool limits authorized users to possession of the power tool within the job site location and wherein the control unit initiates the alarm event when the power tool is located outside of the job site location.

13. The power tool monitoring and security system of claim 1 wherein the control unit generates a departure time for an power tool when the power tool moves from within the job site location to outside of the job site location and wherein the control unit stores the departure time in the data store.

14. The power tool monitoring and security system of claim 1 further comprises a camera that communicates with the control unit and that captures an image of a power tool at an exit point of the job site location when the power tool one of moves from within the job site location to outside of the job site location or moves from outside of the job site location to within the job site location.

15. The power tool monitoring and security system of claim 1 wherein each of the power tools includes a lock-out circuit that disables functional circuitry of the power tool when the lock-out circuit is activated and wherein the control unit activates the lock-out circuit of a given power tool when the privileges associated with the power tool for authorized users of the power tool are exceeded.

16. A power tool monitoring and security system, comprising:

a power tool assigned a unique identifier stored in an embedded RFID tag and operable to transmit an identification signal embodying the identifier over a wireless RF communications link, wherein the power tool includes a lock-out circuit that disables functional circuitry of the power tool when the lock-out circuit is activated;

a data store for maintaining privileges associated with the power tool for authorized users of the power tool; and a control unit adapted to receive the identification signal from the power tool and monitor a position of the power tool within a job site location based on the identification signal, wherein the control unit communicates with the data store and is further operable to activate the lock-out circuit when privileges associated with the power tool for authorized users of the power tool are exceeded.

17. The power tool monitoring and security system of claim 16 wherein the control unit deactivates the lock-out circuit when privileges associated with the power tool for authorized users of the power tool are not exceeded.

18. The power tool monitoring and security system of claim 16 wherein the control unit is further operable to initiate an alarm event when privileges associated with the power tool for authorized users of the power tool are exceeded.

19. The power tool monitoring and security system of claim 16 wherein the data store maintains a list of users authorized to use the power tool and privileges associated with the power tool for each of the authorized users and wherein the control unit is operable to activate the lock-out circuit when privileges associated with a given authorized user for the power tool are exceeded.

20. The power tool monitoring and security system of claim 19 wherein the control unit deactivates the lock-out circuit when privileges associated with a given authorized user for the power tool are not exceeded.

21. The power tool monitoring and security system of claim 19 wherein the control unit is operable to initiate an alarm event when privileges associated with a given authorized user for the power tool are exceeded.

22. The power tool monitoring and security system of claim 16 further comprises a data input device adapted to receive a personal identifier input by a user that uniquely identifies the user during an power tool check-out process.

23. The power tool monitoring and security system of claim 22 wherein the data input device is operable to transmit the personal identifier to the data store and wherein the control unit associates the power tool with the user based on the personal identifier.

24. The power tool monitoring and security system of claim 16 wherein a privilege associated with the power tool for authorized users of the power tool limits authorized users to possession of the power tool within the job site location and wherein the control unit activates the lock-out circuit of the power tool when the power tool is located outside of the job site location.

* * * * *